(12) United States Patent
Takahashi

(10) Patent No.: US 8,755,634 B2
(45) Date of Patent: Jun. 17, 2014

(54) OBSTACLE DETECTION DEVICE AND METHOD AND OBSTACLE DETECTION SYSTEM

(75) Inventor: Katsuhiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 114 days.

(21) Appl. No.: 13/389,590

(22) PCT Filed: Aug. 6, 2010

(86) PCT No.: PCT/JP2010/063389
§ 371 (c)(1),
(2), (4) Date: Feb. 8, 2012

(87) PCT Pub. No.: WO2011/018999
PCT Pub. Date: Feb. 17, 2011

(65) Prior Publication Data
US 2012/0140988 A1 Jun. 7, 2012

(30) Foreign Application Priority Data

Aug. 12, 2009 (JP) ................................. 2009-187271

(51) Int. Cl.
*G06K 9/36* (2006.01)

(52) U.S. Cl.
USPC .......................................................... 382/291

(58) Field of Classification Search
None
See application file for complete search history.

(56) References Cited

U.S. PATENT DOCUMENTS

| 6,661,449 B1 * | 12/2003 | Sogawa ........................ 348/113 |
| 7,317,474 B2 * | 1/2008 | Takeda et al. ................... 348/119 |
| 7,593,587 B1 * | 9/2009 | Rosario ........................ 382/263 |

(Continued)

FOREIGN PATENT DOCUMENTS

| JP | 2001-351107 A | 12/2001 |
| JP | 2004-056763 A | 2/2004 |

(Continued)

OTHER PUBLICATIONS

Rita Cucchiara, Costantino Grana, Massimo Piccardi, Andra Prati. "Detecting Moving Objects, Ghosts, and Shadows in video Stream" IEE, vol. 25. Oct. 2003, hereinafter Cucchiara.*

(Continued)

*Primary Examiner* — Barry Drennan
*Assistant Examiner* — Oneal R Mistry
(74) *Attorney, Agent, or Firm* — McGinn IP Law Group, PLLC

(57) ABSTRACT

An obstacle region candidate point relating unit assumes that a pixel in an image corresponds to a point on a road surface, and associates pixels between images at two times on the basis of the amount of movement of a vehicle in question, a road plane, and a flow of the image estimated. When a pixel corresponds to a shadow of the vehicle in question or the moving object therearound appearing on the road surface, the ratio of intensities of the pixel values of the spectral images between two images should be approximately the same as the ratio of the spectral characteristics of the sunshine in the sun and the shade. Therefore, when the ratio of intensities is approximately the same as the ratio of the spectral characteristics, the obstacle determining unit does not determine that the pixel in question is a point corresponding to the obstacle. Only when the ratio of intensities is not approximately the same as the ratio of the spectral characteristics, the obstacle determining unit determines that the pixel in question is a point corresponding to the obstacle.

20 Claims, 15 Drawing Sheets

(56) References Cited

U.S. PATENT DOCUMENTS

| | | | |
|---|---|---|---|
| 2002/0080998 A1* | 6/2002 | Matsukawa et al. | 382/103 |
| 2003/0210807 A1 | 11/2003 | Sato et al. | |
| 2005/0152580 A1* | 7/2005 | Furukawa et al. | 382/103 |
| 2005/0163343 A1 | 7/2005 | Kakinami et al. | |
| 2006/0111841 A1* | 5/2006 | Tseng | 701/301 |
| 2010/0254595 A1* | 10/2010 | Miyamoto | 382/159 |

FOREIGN PATENT DOCUMENTS

| | | |
|---|---|---|
| JP | 2004-198211 A | 7/2004 |
| JP | 2004-200864 A | 7/2004 |
| JP | 2005-251132 A | 9/2005 |
| JP | 2007-129560 A | 5/2007 |
| JP | 2007-272292 A | 10/2007 |
| JP | 2007-300559 A | 11/2007 |
| JP | 2008-158958 A | 7/2008 |
| WO | WO 2010/044127 A1 | 4/2010 |

OTHER PUBLICATIONS

International Search Report in PCT/JP2010/063389 dated Sep. 7, 2010 (English Translation Thereof).

Koichiro Yamaguchi, Takeo Kato, Yoshiki Ninomiya, "Obstacle Detection in Road Scene using Monocular Camera", IPSJ SIG technical reports, Nov. 18, 2005 (18.11.200), CVIM 2005(112), pp. 69 to 76, items of '2 Teian Shuho no Gaiyo' to '5 Ido Buttai no. Kenshutsu' fig. 1 to 7.

* cited by examiner

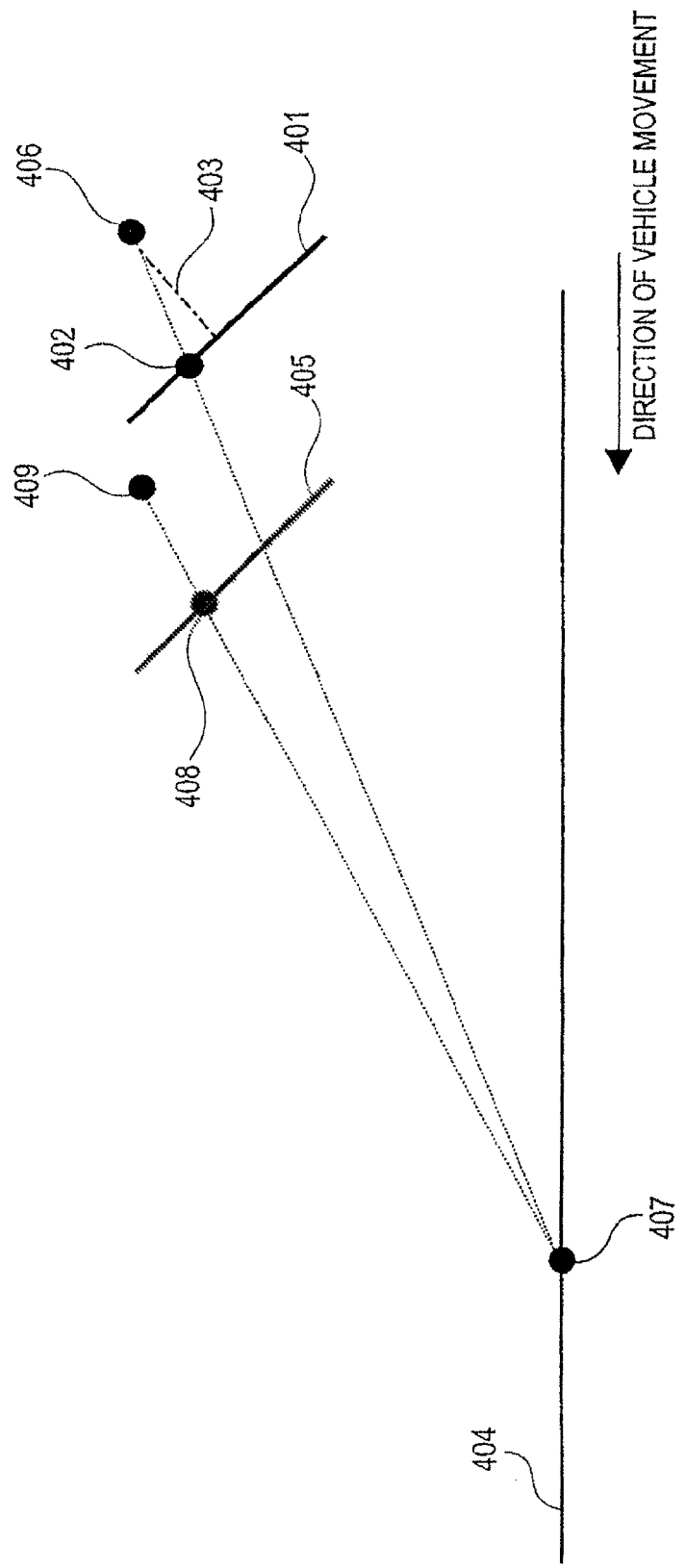

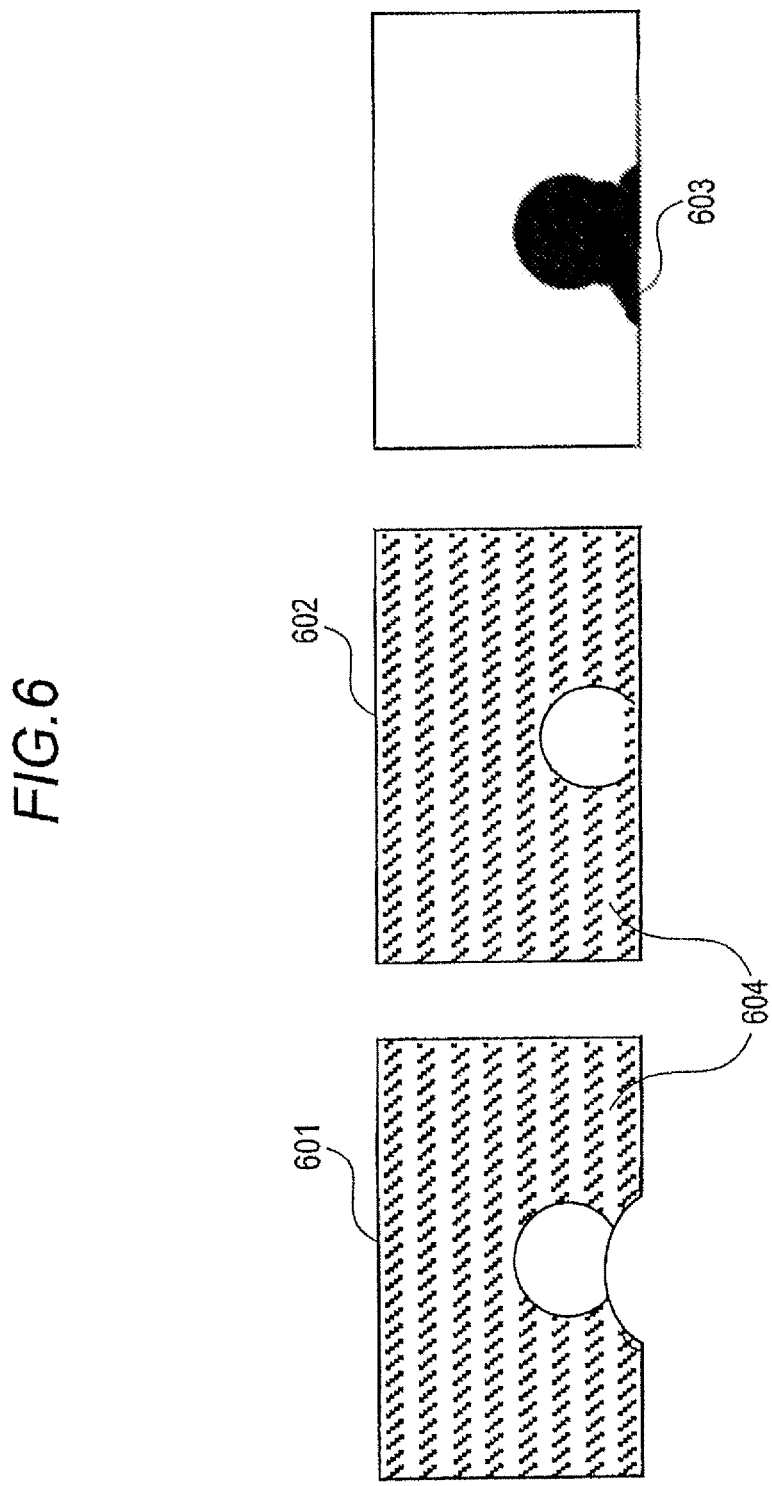

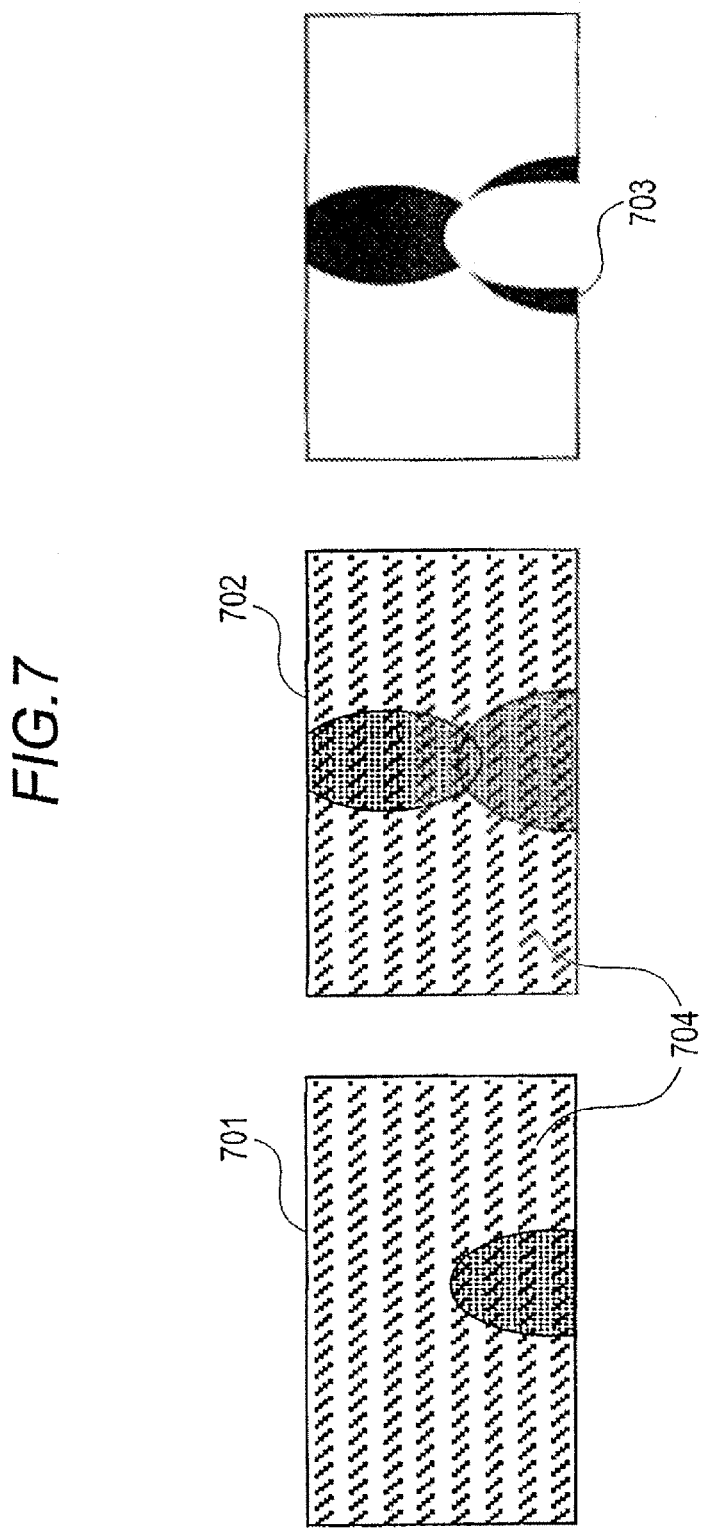

OBSTACLE DETECTION DEVICE AND METHOD AND OBSTACLE DETECTION SYSTEM

TECHNICAL FIELD

This invention relates to an obstacle detection device and a method for detecting an obstacle on a road surface using a vehicle-mounted camera, and also relates to an obstacle detection system using the same.

BACKGROUND ART

Image processing techniques called motion stereo, monocular stereopsis, or Shape from Motion (SfM) are known as techniques for recovering a three-dimensional shape of a scene from a motion image obtained by a moving camera from moment to moment. For example, a method described in PTL 1 is known as a method for putting this technique into practice and detecting an obstacle using a video taken by a vehicle-mounted camera.

When a target object is a stationary object, i.e., when the entire scene is deemed as a rigid body, a three-dimensional shape can be recovered by the motion stereo method. However, with the motion stereo method, an incorrect three-dimensional position that can never happen in reality is calculated for a moving object. In an obstacle detection device, the moving object is a type of an obstacle, and therefore, even if a correct three-dimensional position is not always calculated, it is enough if it is determined that a point at which three-dimensional position information that can never happen in reality is calculated corresponds to the obstacle. However, processing of a moving shadow made by the moving object causes a disadvantage.

The reason why the shadow of the moving object cast upon the road surface causes a disadvantage will be explained in detail with reference to FIG. 1. FIG. 1 is an example where a pedestrian 203 and a pedestrian's shadow 204 cast on a road surface 202 appear in an image 201 of a vehicle-mounted camera. According to the motion stereo method, incorrect three-dimensional position information that can never happen in reality is calculated for pixels corresponding to the pedestrian 203 and the pedestrian's shadow 204. In these circumstances, it is not preferable for the obstacle detection device to determine that the pedestrian's shadow 204 is an obstacle. This is because the pedestrian's shadow 204 does not necessarily obstruct the passage of the vehicle. The same disadvantage occurs when the shadow of the moving vehicle appears in the image 201 of vehicle-mounted camera.

Therefore, it is desired for the obstacle detection device not to falsely determine that a moving shadow of a moving object is an obstacle. Methods disclosed in PTLs 2, 3 and 4 are examples of conventional methods that are considered to be applicable to this disadvantage.

PTL 2 discloses a shadow region determining method for a color (R, G, B) image. In the method of PTL 2, R, G, B values at a region border pixel are compared with R, G, B values of eight pixels around the region border pixel, and a determination is made as to whether the region border pixel is in a shadow region or not on the basis of the magnitude relation of the R, G, B values. When the method described in PTL 2 is applied to a video that is input from a vehicle-mounted camera of an obstacle detection device from moment to moment, it may be possible to reduce the chance of falsely determining that a point corresponding to a shadow of a moving object is an obstacle.

In a method disclosed in PTL 3, two images taken from the same position in the real word are compared, and attention is given to a region where a pixel value changes. When pixel gradations in the changed region are uniform, the region is determined to be a shadow region. In a method disclosed in PTL 4, position information of the sun is obtained, and a region of a shadow cast by a vehicle is estimated, and correction is made on an image.

CITATION LIST

Patent Literature

{PTL 1} Japanese Patent Laid-Open No. 2004-198211 (FIG. 3, paragraph {0014})
{PTL 2} Japanese Patent Laid-Open No. 2007-272292 (FIG. 2)
{PTL 3} Japanese Patent Laid-Open No. 2004-200864 (FIG. 4)
{PTL 4} Japanese Patent Laid-Open No. 2007-300559 (FIG. 3)

SUMMARY OF INVENTION

Technical Problem

Disadvantages occur when the methods disclosed in PTL 2 to 4 are applied to the obstacle detection device. First, the technique of PTL 3 requires the two images taken from the same position, and therefore, the technique of PTL 3 cannot be applied when the vehicle is moving. The method of PTL 4 can be applied to the shadow of the vehicle, but this cannot be applied when moving objects around the vehicle such as a vehicle and a person around the vehicle move. This is because it is difficult to make these three-dimensional shapes into models in advance.

The method of PTL 2 is a technique for detecting and correcting the shadow region using only one image. In the method of PTL 2, it is considered to be difficult to correctly determine the shadow region only by comparing the R, G, B values of the pixels adjacent to each other as a matter of reality. In an extreme example, when a region corresponding to a white object is in contact with a region corresponding to a black object, the magnitude relation of the R, G, B values of the pixels adjacent to each other in the region border is similar to the magnitude relation of the R, G, B values at the border between sun and shade.

This kind of situation is not limited to the border between the white object and the black object. It often happens that one object has a reflectance ratio higher than that of the other object in all the three wavebands corresponding to R, G, B.

Further, in view of the purpose of the obstacle detection device to avoid falsely determining that the shadow cast by the moving object is an obstacle, only the shadow of the moving object appearing on the road surface is the shadow region that must be correctly determined. However, since PTL 2 is applied to the entire screen, more processing occurs than what is necessary.

Accordingly, an exemplary object of the present invention is to prevent falsely detecting that a shadow cast by a vehicle or a moving object around the vehicle is an obstacle when an obstacle is detected from an image taken by a vehicle-mounted camera.

Solution to Problems

According to a first exemplary aspect of the present invention, there is provided an obstacle detection device for detecting an obstacle around a vehicle from a spectral image obtained by an imaging unit mounted on the vehicle, the obstacle detection device including:

an image storage unit for storing an image provided by the imaging unit;

a flow extraction unit for extracting a flow of a pixel from images stored at two different times in the image storage unit;

a vehicle movement amount estimation unit for estimating an amount of movement of the vehicle in a real world based on the extracted flow;

a road plane estimation unit for estimating a position of a road plane based on the extracted flow and the amount of movement of the vehicle;

an obstacle candidate point relating unit relating pixels in images at the two times by using a pixel in an image at an earlier time as a reference, by assuming that the pixel corresponds to the road plane in the real world, and by extracting a corresponding pixel at a current time based on the amount of movement of the vehicle;

a non-matching range identifying unit for comparing, pixel by pixel, partial images having centers at obstacle candidate points related between the pixels in the images at the two times, and identifying a range in which pixel values are different as a non-matching range; and an obstacle determining unit for comparing the pixel values in the spectral images at the two times corresponding to the non-matching range, and determining whether the obstacle candidate point is a point corresponding to a shadow on the road plane or a point corresponding to an actual obstacle.

According to a second exemplary aspect of the present invention, there is provided an obstacle detection method for detecting an obstacle around a vehicle from a spectral image obtained by an imaging unit mounted on the vehicle, the obstacle detection method including:

causing an image storage unit to store a image provided by the imaging unit;

extracting a flow of a pixel from images stored at two different times in the image storage unit;

estimating an amount of movement of the vehicle in a real world based on the extracted flow;

estimating a position of a road plane based on the extracted flow and the amount of movement of the vehicle;

relating pixels in images at the two times by using a pixel in an image at an earlier time as a reference, by assuming that the pixel corresponds to the road plane in the real world, and by extracting a corresponding pixel at a current time based on the amount of movement of the vehicle;

comparing, pixel by pixel, partial images having centers at obstacle candidate points related between the pixels in the images at the two times, and identifying a range in which pixel values are different as a non-matching range; and comparing the pixel values in the spectral images at the two times corresponding to the non-matching range, and determining whether the obstacle candidate point is a point corresponding to a shadow on the road plane or a point corresponding to an actual obstacle.

According to a third exemplary aspect of the present invention, there is provided an obstacle detection system including:

a vehicle-mounted apparatus having the obstacle detection device according to the present invention mounted thereon; and an information center apparatus for transmitting and receiving data to/from the vehicle-mounted apparatus, the vehicle-mounted apparatus including:

a vehicle-side data transmission unit for transmitting current position information to the information center apparatus; and a vehicle-side data reception unit for receiving spectral characteristic data from the information center apparatus, the information center apparatus including:

a detailed sunshine spectral characteristic database for storing relationship between spectral characteristics of sunshine in sun and shade in association with position information and a time;

a center-side data reception unit for receiving the current position information from the vehicle-side data transmission unit of the vehicle-mounted apparatus;

a sunshine spectral characteristic obtaining unit for searching spectral characteristic data of sunshine in the sun and the shade corresponding to the position information and the current time from the detailed sunshine spectral characteristic database; and a center-side data transmission unit for transmitting the spectral characteristic data obtained by the sunshine spectral characteristic obtaining unit to the vehicle-mounted apparatus, wherein the obstacle determining unit determines whether the obstacle candidate point corresponds to an obstacle or not, based on the spectral characteristic data received by the vehicle-side data reception unit.

According to a fourth exemplary aspect of the present invention, there is provided a computer-readable information recording medium storing a program for causing a computer to function as a flow extraction unit for extracting a flow of a pixel from images stored at two different times in an image storage unit;

a vehicle movement amount estimation unit for estimating an amount of movement of the vehicle in a real world based on the extracted flow;

a road plane estimation unit for estimating a position of a road plane based on the extracted flow and the amount of movement of the vehicle;

an obstacle candidate point relating unit relating pixels in images at the two times by using a pixel in an image at an earlier time as a reference, by assuming that the pixel corresponds to the road plane in the real world, and by extracting a corresponding pixel at a current time based on the amount of movement of the vehicle;

a non-matching range identifying unit for comparing, pixel by pixel, partial images having centers at obstacle candidate points related between the pixels in the images at the two times, and identifying a range in which pixel values are different as a non-matching range; and an obstacle determining unit for comparing the pixel values in the spectral images at the two times corresponding to the non-matching range, and determining whether the obstacle candidate point is a point corresponding to a shadow on the road plane or a point corresponding to an actual obstacle.

In the present application, "vehicle" means a vehicle having two or more wheels such as a motorcycle, a three-wheel automobile, and a four-wheel automobile, or a train.

Advantages Effects of Invention

An exemplary mode of the present invention can prevent falsely detecting that a shadow of a moving object cast upon a road surface is an obstacle.

BRIEF DESCRIPTION OF DRAWINGS

FIG. 4 A figure illustrates positional relationship of a point on a road plane and a point on an image at two times.

FIG. 6 A figure illustrates a non-matching range and partial images observed in a case of FIG. 5C.

FIG. 7 A figure illustrates a non-matching range and partial images observed in a case of FIG. 5D.

DESCRIPTION OF EMBODIMENT

Subsequently, exemplary embodiments for carrying out the present invention will be explained in detail with reference to drawings.

First Embodiment

Figure 1:
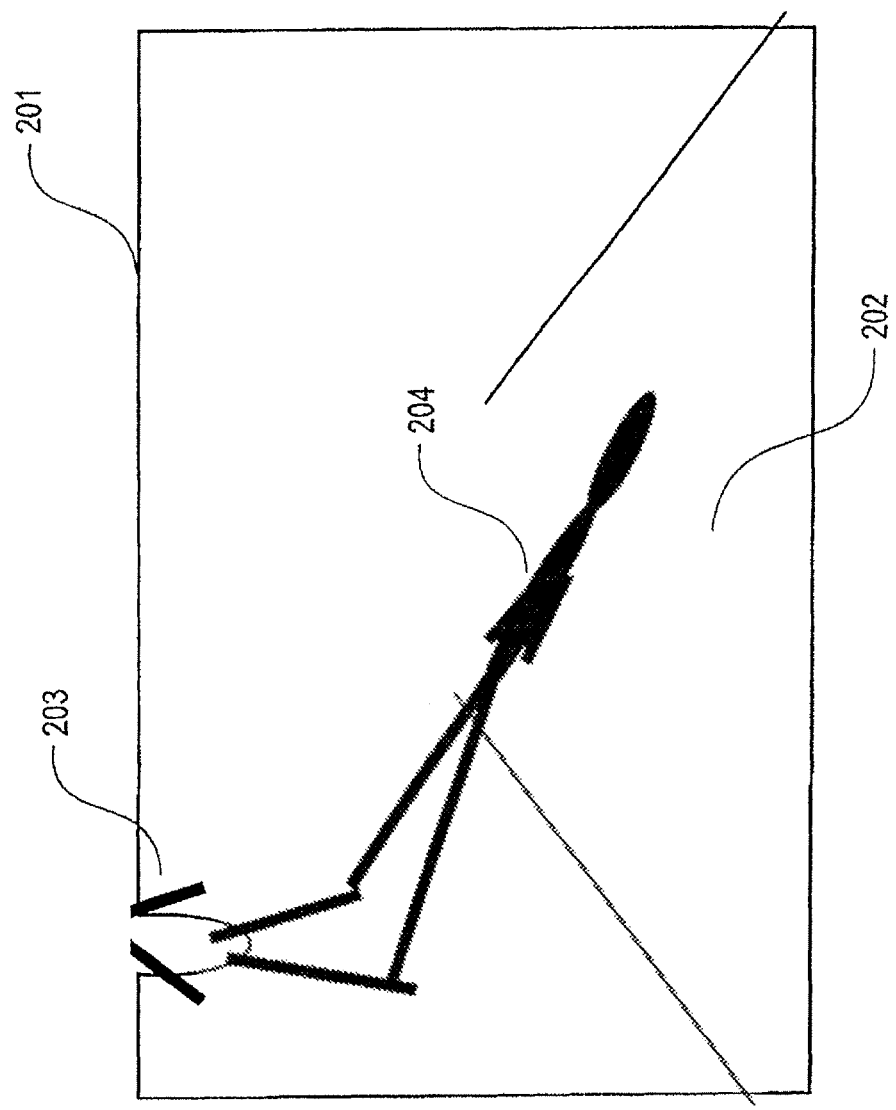
FIG. 1 A figure illustrates an example of situation where a shadow of a moving object appearing on a road surface causes a disadvantage.
Figure 2:
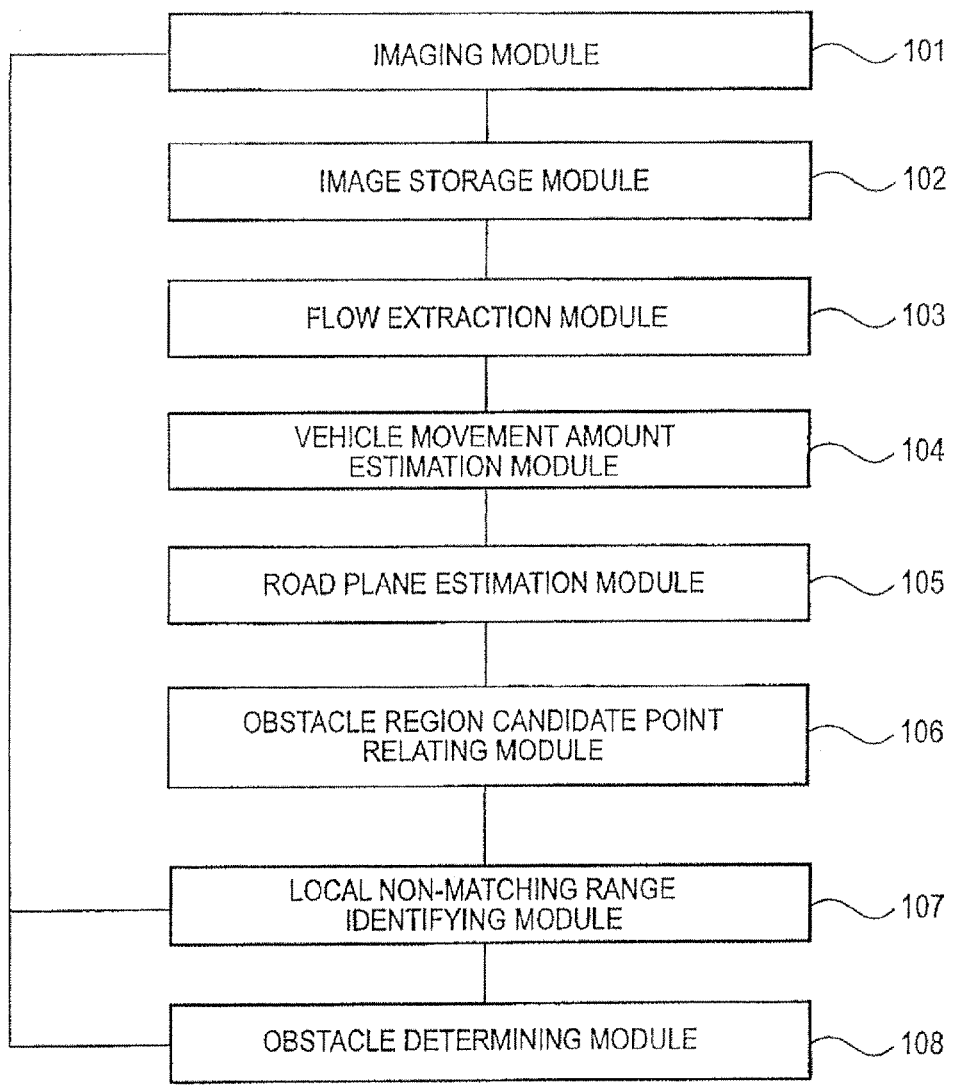
FIG. 2 A block diagram illustrates the first embodiment of an obstacle detection device according to the present invention.

FIG. 2 is a block diagram illustrating the first embodiment of an obstacle detection device according to the present invention. The obstacle detection device as shown in FIG. 2 includes an imaging module (image capturing module) 101 taking a spectral image, an image storage module 102 storing images, a flow extraction module 103 for extracting a flow (the amount of movement) of every point from an image obtained at the current time and an earlier time than the current time, and a vehicle movement amount estimation module 104 for estimating the amount of movement of the vehicle on the basis of the flow provided by the flow extraction module 103. The imaging module 101, the image storage module 102, the flow extraction module 103, and the vehicle movement amount estimation module 104 correspond to an imaging unit, an image storage unit, a flow extraction unit, and a vehicle movement amount estimation unit, respectively.

The obstacle detection device as shown in FIG. 2 includes a road plane estimation module 105 for estimating a parameter indicating a road plane on the basis of the flow given by the flow extraction module 103 and the amount of movement of the vehicle estimated by the vehicle movement amount estimation module 104, and an obstacle candidate point relating module 106 for extracting a corresponding pixel at the current time on the basis of the amount of movement of the vehicle estimated on the assumption that each pixel in the image at the earlier time corresponds to the road plane in the real world. The road plane estimation module 105 and the obstacle candidate point relating module 106 correspond to a road plane estimation unit and an obstacle candidate point relating unit, respectively.

Further, the obstacle detection device as shown in FIG. 2 includes a local non-matching range identifying module 107 for identifying, as a non-matching range, a range in which pixels values of the spectral image are different with respect to a combination of partial images around the obstacle candidate points associated between the images at two times, and an obstacle determining module 108 for determining whether the obstacle candidate point is a point corresponding to a shadow on the road plane or an obstacle by comparing the pixel values in the partial images corresponding to the non-matching range. The local non-matching range identifying module 107 and the obstacle determining module 108 correspond to a non-matching range identifying unit and an obstacle determining unit.

The imaging module 101 is constituted by an imaging apparatus (image capturing apparatus) such as a video camera capable of capturing an image including spectral information, and capturing and outputting a spectral image from moment to moment. The image including the spectral information may be a multispectral image obtained by a multispectral camera and a color image obtained by an ordinary color camera.

Figure 3:
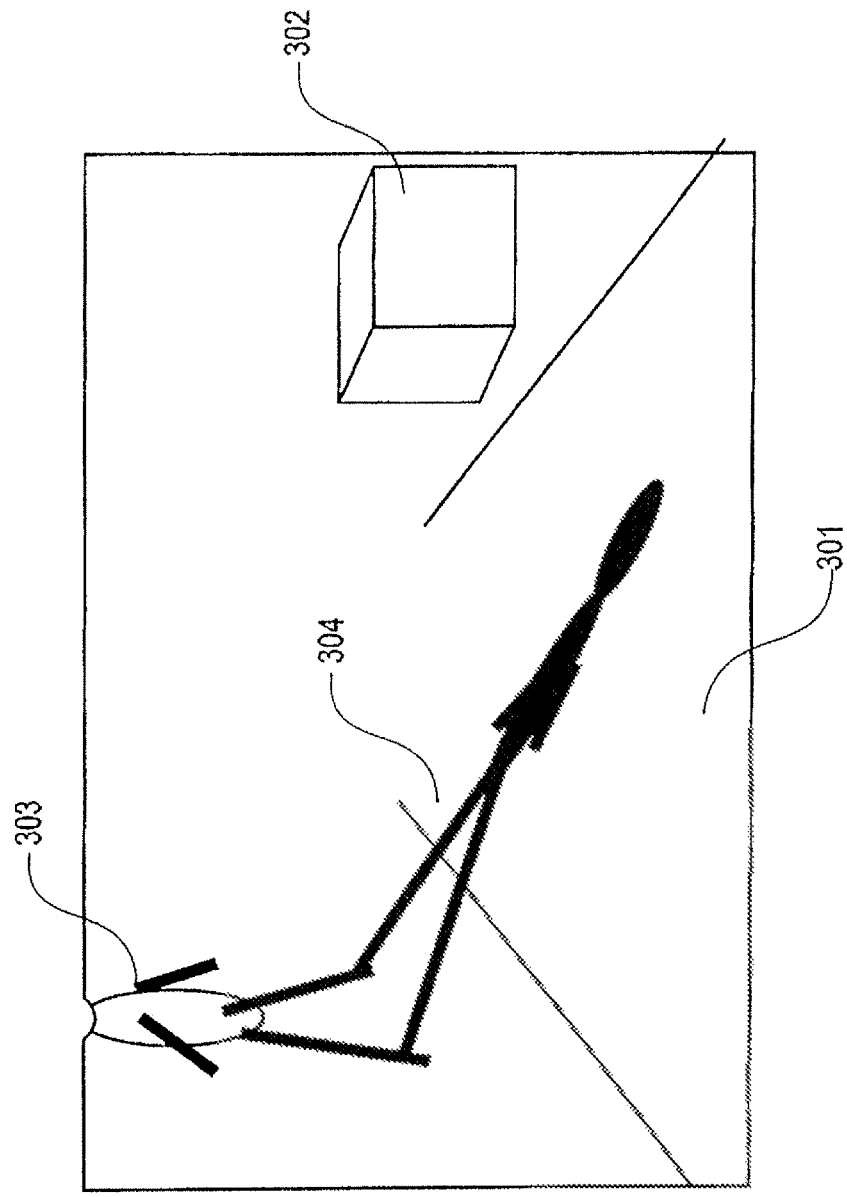
FIG. 3 A figure illustrates an example of a vision field of the imaging module.

FIG. 3 illustrates an example of a vision field of the imaging module 101. The vision field of the imaging module 101 includes not only a road surface 301 in a direction in which the vehicle moves but also objects therearound. The objects therearound include a stationary obstacle 302 and a moving obstacle 303. A shadow 304 of an obstacle may be captured. The imaging module 101 may be configured to output a perspective projection image using an ordinary lens and may be configured to output a wide-angle or fish-eye lens image such as a parking support rear view camera.

The imaging module 101 obtains the captured spectral image from moment to moment, and stores the captured spectral images to the image storage module 102. Further, when the multispectral camera is used, information about a wavelength at which difference of wavelength characteristics of sunlight in the sun and the shade can be easily detected is included as explained later in detail.

The image storage module 102 is a module for storing the spectral images stored by the imaging module 101 at the current time and times in the past. However, the number of images (the number of frames) to be stored is reduced to a certain level or less in order to reduce the storage device capacity needed for the storage to a level equal to or less than a certain level. The method for limiting the number of images is as follows. For example, when the vehicle moves, and the images changing from the imaging module from moment to moment are input, only images of a certain number of frames from a later image may be stored, and older images may be deleted in order. Alternatively, when the vehicle is at a stop, and the images do not change, an image stored at an earlier time may be deleted in order instead of storing the latest image. Further, in another method for limiting the number of images, for example, an image may be stored every time the vehicle advances a certain distance, and the other images may be discarded immediately.

The flow extraction module 103 looks up the image newly stored to the image storage module 102 and the image stored in the earlier time, extracts the flow of pixels during this time (the amount of movement), and outputs the flow information to the vehicle movement amount estimation module 104. In this processing, it is necessary to look up the pixel values of all the spectral components of the spectral image, and, for example, pixel values concerning one wavelength may be used. Various kinds of methods have been suggested as a specific method for extracting the flow of the spectral component.

For example, an optical flow extraction technique described in NPTL 1 and the like (referred to as gradient method) in a narrow sense can be used.

(NPTL 1) Ohta: "Form-Restoration from Optical Flow having Reliability Information and Its Application for Moving Object Detection", The Institute of Electronics, Information and Communication Engineers Transactions (D-II), Vol. J76-D-II, No. 8, pp. 1562-1571 (1993.8).

In this method, it is assumed that gradation values of pixels around a pixel in question can be approximated in first order in a plane. The amounts of gradients in the x, y axes directions on the plane are denoted with Ix, Iy, the amount of variation in gradation at the pixel in question between two times is denoted with It, and flow components in the x, y axes directions of the pixel in question are denoted with dx, dy. This method makes use of the following relationship satisfied therebetween.

$$dx \cdot Ix + dy \cdot Iy = It$$

It is impossible to uniquely determine dx, dy with only the above expression. Therefore, in reality, the expression obtained above is used as simultaneous equations with each pixel near the pixel in question, whereby a flow (dx, dy) is obtained. The flow may be obtained for all the points with all the pixels in the image being the pixels in question, or the flow may only be obtained for pixels with a constant interval.

Alternatively, only distinctive points such as corner points obtained by using HARRIS corner detection operator may be obtained. Further, the flow may be obtained based on one of the two images. The present embodiment is explained as a flow based on an image at an earlier time for the sake of brevity.

A method by relating distinctive points (block matching) is known as a flow extraction method other than the gradient method. More specifically, for example, method described in NPTL 2 is known.

(NPTL 2) "optical flow", the Internet <URL: "http://opencv.jp/sample/optical#flow.html" (function name: cvCalcOpticalFlowBM).

In this method, distinctive pixels such as corners are respectively extracted from the images obtained at two times, and based on image feature around each corner pixel, corner pixels having similar image features are associated with each other, whereby the positional relationship thereof is adopted as a flow. In the block matching method, not only the corner pixels associated with each other but also corner pixels at which no corresponding pixel is extracted from the image at the other time are extracted as an intermediate processing result. The points that could not be related are used in the processing after the obstacle candidate point relating module 106 explained later.

Even when either the gradient method or the block matching method is used, the flow information can be expressed in a format of a combination including a start point and an end point of a flow or a start point of a flow and x, y axes direction components of the flow.

The vehicle movement amount estimation module 104 estimates the vehicle from the flow information obtained by the flow extraction module 103. This module 104 can estimate the movement of the vehicle using the known techniques described in NPTL 3, NPTL 4, and the like.

(NPTL 3) R. Hartley, et. al, Multiple View Geometry, Cambridge university press, ISBN 0-521-54051-8.

(NPTL 4) R. Hartley, In Defense of the Eight-Point Algorithm, IEEE Transactions on Pattern Recognition and Machine Intelligence, Vol. 19, No. 6, pp. 580-593 (1997).

According to NPTL 3, NPTL 4, and the like, the amount of movement of the vehicle is expressed as a 3×3 fundamental matrix F shown below.

$$F = \begin{pmatrix} f_{11} & f_{12} & f_{13} \\ f_{21} & f_{22} & f_{23} \\ f_{31} & f_{32} & f_{33} \end{pmatrix} = \begin{pmatrix} 0 & -t_z & t_y \\ t_z & 0 & -t_x \\ -t_y & t_x & 0 \end{pmatrix} \begin{pmatrix} r_{11} & r_{12} & r_{13} \\ r_{21} & r_{22} & r_{23} \\ r_{31} & r_{32} & r_{33} \end{pmatrix}$$

[Numerical expression 1]

In this case, tx, ty, tz denote components of translation vector T=(tx, ty, tz) T in directions of x, y, z axes.

$$\begin{pmatrix} r_{11} & r_{12} & r_{13} \\ r_{21} & r_{22} & r_{23} \\ r_{31} & r_{32} & r_{33} \end{pmatrix}$$

[Numerical expression 2]

Numerical expression 2 represents 3×3 rotation vector as shown in the following Numerical expression 3.

$$R = \begin{pmatrix} r_{11} & r_{12} & r_{13} \\ r_{21} & r_{22} & r_{23} \\ r_{31} & r_{32} & r_{33} \end{pmatrix}$$

[Numerical expression 3]

In the present embodiment, since the image at the earlier time is used as a reference, the fundamental matrix F represents the amount of movement of the vehicle from the earlier time to the current time.

The road plane estimation module 105 estimates an equation representing the road plane on the basis of the flow information extracted by the flow extraction module 103, the rotation vector, and the translation vector estimated by the vehicle movement amount estimation module 104. On this occasion, using a method such as method direct linear transformation (DLT) method described in NPTL 3, three-dimensional positions of points in the real world corresponding to the start point and the end point of the flow can be obtained from the condition of the amount of movement of the vehicle estimated for each flow. Therefore, a three-dimensional plane is obtained so that distances with as many points as possible in the real world are equal to or less than a threshold value, and this plane is adopted as the road plane. Both of the start point and the end point of the flow providing a point in the three-dimensional space at which the distance from the estimated road plane is equal to or less than the threshold value are considered to be the points corresponding to the road plane in the real world.

The obstacle candidate point relating module 106 uses the pixels in the image at the earlier time as a reference and assumes that the pixels correspond to the road plane in the real world under the condition of the road plane estimated by the road plane estimation module 105, the rotation vector, and the translation vector estimated by the vehicle movement amount estimation module 104, thereby extracting and relating the pixels corresponding to the image at the current time.

The flow extraction module 103 and the vehicle movement amount estimation module 104 are considered to associate the start point position and the end point position of the flow. In the processing after this module, the translation vector, the rotation vector, and the road plane are uniquely defined. Therefore, the pixels in the image at the current time can be identified with respect to the pixels in the image at the earlier time, and the position thereof does not necessarily match the end point position of the flow.

More specifically, the pixels in the image at the earlier time used as a reference may be all the pixels included in the image, may be pixels extracted with a certain interval, or may be corner pixels obtained by HARRIS corner detection operator and the like. When the flow is extracted by the block matching, corner pixels whose corresponding points could not be detected may be included. Further, only the pixels among these points that do not give the flow in consistent with the amount of movement of the vehicle and the road plane may be associated, or when the amount of movement of the vehicle is assumed to be a certain value, or only pixels that do not satisfy epipolar constraint may be associated.

The reason why the associated pixels can be limited to only the pixels that do not give the flow in consistent with the amount of movement of the vehicle and the road plane is that the pixels giving the flow in consistent with the amount of movement of the vehicle and the road plane are estimated to be the pixels corresponding to the road plane, and therefore can be excluded from the associated pixels. The reason why the associated pixels can be limited to only the pixels that do not satisfy epipolar constraint when the amount of movement of the vehicle is assumed to be a certain value is that moving objects and shadows thereof do not satisfy epipolar constraint in general.

Subsequently, the method for obtaining corresponding pixels will be explained. FIG. 4 is a figure for explaining positional relationship of a point on a road plane and a point on an image at two times. First, we focus on an image 401 in an earlier time. A pixel 402 on the image 401 is denoted as P (x0, y0) (however, this is a pixel position in a coordinate system having an origin point in the center of the image), and a corresponding point of the pixel P is obtained as follows. A focal length f 403 of the imaging module 101 is denoted as a unit distance 1, and the x axis, y axis of the image is represented in a new coordinate system with f being the unit distance (this is referred to as a camera-centered coordinate system). When the optical axis direction is z axis, the three-dimensional position of the pixel P is a point P (x0', y0', 1).

It should be noted that x0', y0' are values obtained by multiplying the values of x, y by (pitch of the imaging device/f). Assuming that this point corresponds to a point on the road plane 404 in the real word represented by ax+by+cz+1=0 (a, b, c are constants) in the camera-centered coordinate system is nothing but assuming that the pixel 402 corresponds to an intersection point 407 between the road plane 404 and a straight line passing through the origin point 406 and the pixel 402.

On this occasion, when the intersection point 407 is denoted with P', the coordinate value is as follows: P'=(sx0', sy0', s) (where s=−1/(ax0+by0+c)). Therefore, coordinate values x", y" of a point P''' corresponding to the point P' in the image 405 at the current time are as follows.

$$x''=R1(I'-T)/R3(I'-T)$$

$$y''=R2(I'-T)/R3(I'-T)$$

In this case, Rn denotes a row vector of the n-th row of a rotating matrix R. When the values x", y" are finally multiplied by (pitch of the imaging device/f)−1, the values can be converted into the pixel position 408 of the image (however, this is a pixel position in the coordinate system having the origin point in the center of the image).

The local non-matching range identifying module 107 compares the point P extracted from the image at the earlier time and a partial region around the corresponding point P''' corresponding to the point P in units of pixels, and obtains a non-matching range. The size of the partial image is defined in advance. The method of comparison may be adopting pixels whose differences of pixel values are equal to or more than a threshold value as the non-matching range, or may be adopting pixels whose ratios of pixel values are beyond a predetermined range as the non-matching range.

Selection of the pixels to be compared may be based on the pixel value of the brightness component of the color image, the pixel value of a certain wavelength component of the color image and the multispectral image, or a value obtained by adding values of a plurality of wavelength components with weighting. Alternatively, when compared for each wavelength component, pixels not in consistent in one or more wavelength components may be adopted as a non-matching range.

In this case, relationship between a type of a target object in the real world and how a non-matching range thereof is extracted will be explained with reference to FIGS. 5A-5D. Target objects in the real world corresponding to the pixels in the image include four things as follows.

(i) Road surface
(ii) Stationary obstacle
(iii) Moving obstacle
(iv) Shadow on road surface cast by moving obstacle In the obstacle detection, all the things other than the road surface in the real world are defined as obstacles. Due to the nature of the processing in this case, the shadow cast by the stationary obstacle is treated the same as a pattern, and therefore, a shadow of the stationary obstacle on the road surface may be treated as corresponding to the road surface, and a shadow of the stationary obstacle on the obstacle may be treated as corresponding to the obstacle.

Figure 5A:
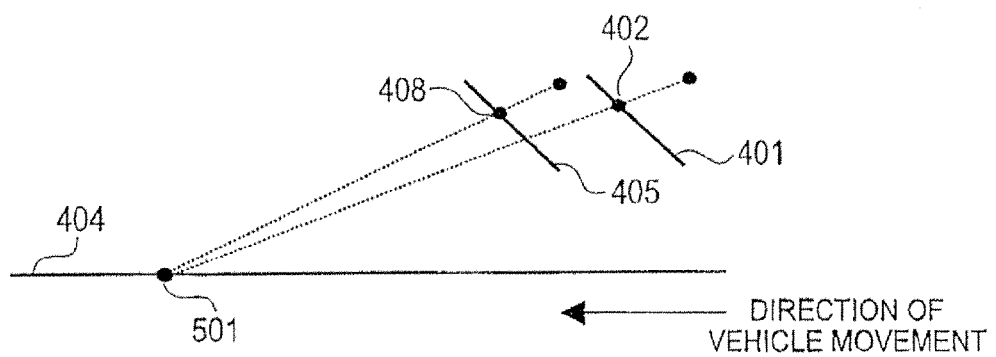
FIGS. 5A-5D Figures illustrate relationship of an image capturing situation and how a non-matching range is extracted.

First, a case in which the pixel 402 corresponds to a point of (i) road plane will be explained with reference to FIG. 5A. In this case, the obstacle candidate point relating module 106 obtains the pixel 408 on the assumption that the pixel 402 corresponds to a point on the road plane. Therefore, both of the pixel 402 and the pixel 408 correspond to a point 501 in the real world, and the partial images about the pixel 402 and the pixel 408 are considered to match each other. Therefore, when the pixel 402 corresponds to the point of (i) road plane, no non-matching range is extracted.

Figure 5B:
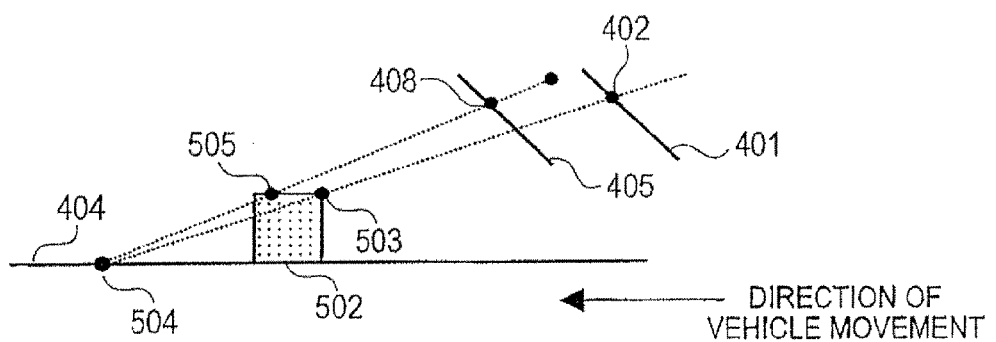

Subsequently, a case in which the pixel 402 corresponds to (ii) stationary obstacle will be explained with reference to FIG. 5B. FIG. 5B shows an example where the pixel 402 is extracted on the image 401 as a pixel corresponding to a corner point 503 of a stationary obstacle 502. On this occasion, since the pixel 408 is a pixel obtained on the assumption that the pixel 402 corresponds to a point on the road surface, a pixel position corresponding to an intersection point 504 between the road plane and a straight line connecting between the pixel 402 and a corner point 503 is extracted in reality, and in the situation of FIG. 5B, this corresponds to a point 505 of the stationary obstacle 502. Therefore, naturally, the partial images about the pixel 402 and the pixel 408 are not similar to each other, and the entire local region or most of the portion is extracted as a non-matching range.

Figure 5C:
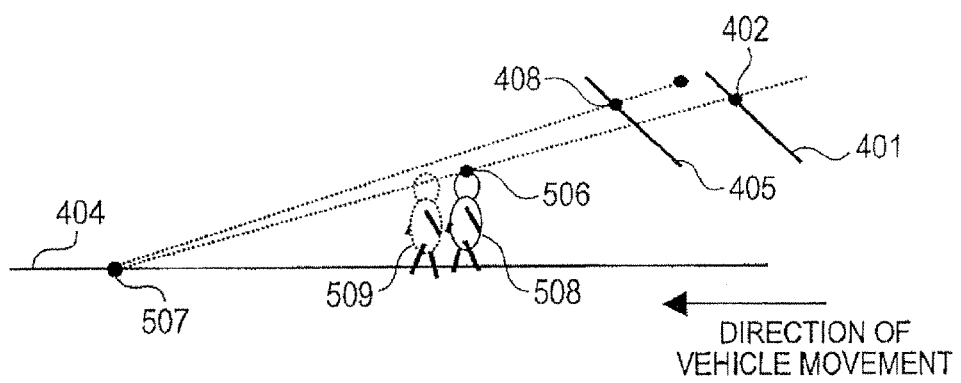

Subsequently, a case in which the pixel 402 corresponds to (iii) moving obstacle will be explained with reference to FIG. 5C. FIG. 5C is a figure showing a case in which a pedestrian, i.e., a moving obstacle, moves from the position 508 at the earlier time to the position 509 at the current time, and shows an example where the pixel 402 corresponding to a parietal region 506 of the pedestrian is extracted. In this case, like the case of the stationary obstacle, the pixel 408 is a pixel corresponding to a point 507 on the road surface in reality. Therefore, in this case, the partial images about the pixel 402 and the pixel 408 on the images are naturally not similar to each other, and the entire partial image or most of the portion is extracted as a non-matching range.

Figure 5D:
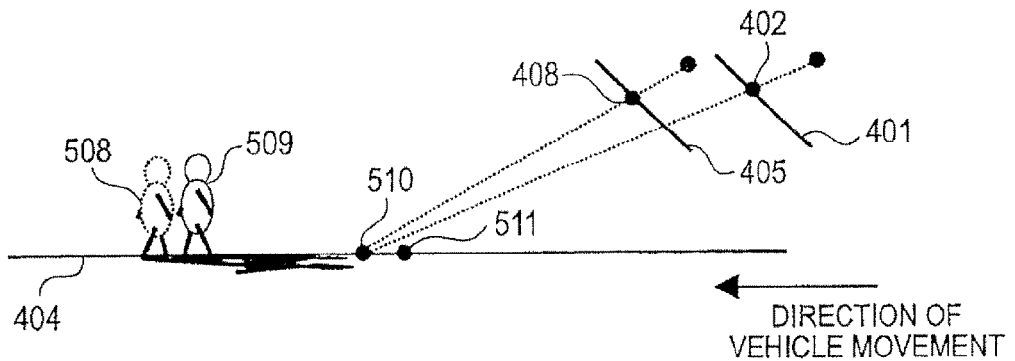

Finally, a case in which the pixel 402 corresponds to (iv) shadow on the road plane cast by the moving obstacle will be explained with reference to FIG. 5D. FIG. 5D is a figure showing a case in which a pedestrian moves from the position 508 to the position 509 and accordingly a shadow moves from a position 510 to a position 511, and shows an example where the pixel 402 corresponding to the position of the shadow corresponding to a parietal region of the pedestrian in the earlier time is extracted. In this case, since the pixel 408 is extracted at the pixel position corresponding to the position 510, both of the pixel 402 and the pixel 408 correspond to the point 510 in the real world, and the partial images should match each other except whether they have the shadow or not. Therefore, only the road surface range of the partial images in which the state of the sun and the shade is different is extracted as a non-matching range.

The obstacle determining module 108 compares the partial images at two times corresponding to the non-matching range, and determines whether the obstacle candidate point is a point that is truly caused by an obstacle. First, when the non-matching portion is not detected as described above, the obstacle candidate point can be immediately determined to be a point corresponding to the road plane, which is not determined as the obstacle. The problem occurs when the non-matching portion is extracted. In such case, this module 108 uses color images and multispectral camera images including wavelength information to determine whether the obstacle candidate point is a point caused by an obstacle or a point caused by a shadow cast by a moving object onto the road plane FIG. 6 is a figure illustrating a non-matching range 603 and partial images 601, 602 observed in a case of FIG. 5C. FIG. 7 is a figure illustrating a non-matching range 703 and partial images 701, 702 observed in a case of FIG. 5D. Both of diagonal line ranges 604, 704 are ranges corresponding to the road surface.

When ranges in the partial images 601, 602 corresponding to the non-matching range 603 are compared pixel by pixel, there may be some pixels that correspond to the pedestrian in one of the images and correspond to a road surface in the other of the images, and although some pixels correspond to the same pedestrian, the pixels may correspond to different positions of the body. On the other hand, when ranges in the partial images 701, 702 corresponding to the non-matching range 703 are compared pixel by pixel, both correspond to the same road surface, and are different only in the state as to whether the ranges are in the sun or in the shade.

Now, using color images and multispectral camera images including wavelength information, specific principle for distinguishing the above two cases will be explained. The following relationship holds, where a wavelength property of a light source is denoted as $S(\lambda)$, a reflectance ratio of an object appearing in a non-matching region is denoted as $R(\lambda)$, sensitivity of an imaging device with respect to the n-th wavelength is denoted as $Cn(\lambda)$, and intensity of a captured image in the n-th wavelength is denoted as In.

$$In = \sum_{\lambda} S(\lambda) \times R(\lambda) \times Cn(\lambda)$$ [Numerical expression 4]

In this case, the n-th wavelength means order defined as follows. For example, in a case of a color image, a waveband of blue is defined as the 1st wavelength, a waveband of green is defined as the 2nd wavelength, and a waveband of red is defined as the 3rd wavelength. When a multispectral camera is used, for example, the n-th wavelength means order defined as follows. When a multispectral camera for wavelengths of 400 nm to 700 nm obtains an image in which wavebands have central intensities with 50 nm interval, the image has seven types of wavelengths as follows. A waveband around 400 nm is defined as the 1st wavelength, a waveband around 450 nm is defined as the 2nd wavelength, . . . , and so on. It is perfectly alright to define the order differently from the above.

Now, when a pixel in question corresponds to the shadow region of the moving object appearing on the road surface, the difference in the intensities of the pixels in the non-matching range between the two images is deemed to be caused only by the difference in $S(\lambda)$ in the above expression, and $R(\lambda)$ is deemed to be the same in both of them. Naturally, $Cn(\lambda)$ is the same, and the value thereof can be obtained in advance. Since material widely used for paving road such as asphalt and concrete have spectral reflection characteristics not so much relying on wavelengths in visible light range, the value of $R(\lambda)$ can be approximated with a certain value.

On this occasion, where spectral characteristics of the sunlight in the sun and the shade are denoted as $Ssun(\lambda)$, $Sshade(\lambda)$, respectively, a ratio of pixel values in the n-th wavelength concerning the regions in the sun and the shade in the two partial images corresponding to the non-matching range is equal to a ratio between $\Sigma Ssun(\lambda) \times Cn(\lambda)$ and $\Sigma Sshade(\lambda) \times Cn(\lambda)$.

On the other hand, when the pixel corresponds to the obstacle, the above relationship does not hold since the two partial images correspond to different objects in the real world as described above. It should be noted that the spectral characteristics of the sunlight in the sun and the shade can be estimated using spectral characteristic model of sunshine near the ground (direct light, diffused light component) such as Bird model.

Accordingly, a pixel value concerning the n-th wavelength in the image including the sunny area of the two partial images corresponding to the non-matching range is defined as follows.

$$I_n^{sun}$$ [Numerical expression 5]

A pixel value concerning the n-th wavelength in the image including the shade area thereof is defined as follows.

$$I_n^{shade}$$ [Numerical expression 6]

In this case, for example, a determination can be made using the following conditional expression.

$$C_1 = \max_n \left\| \frac{\sum_\lambda S_{shade}(\lambda) * C_n(\lambda)}{\sum_\lambda S_{sun}(\lambda) * C_n(\lambda)} - \frac{I_n^{shade}}{I_n^{sun}} \right\|$$ [Numerical expression 7]

In the above expression, when the value of C1 is larger than a threshold value, the pixel in question can be determined to correspond to the obstacle. When the value of C1 is smaller than the threshold value, the pixel in question can be determined to correspond to the shadow of the object moving on the road surface.

Alternatively, the following conditional expression may be used, in which a result obtained by making comparison or each wavelength is added with a weight Wn. In the expression, when the value of C2 is larger than a threshold value, the pixel in question can be determined to correspond to the obstacle. When the value of C2 is smaller than the threshold value, the pixel in question can be determined to correspond to the shadow of the object moving on the road surface. The weight Wn is set such that the weight Wn is larger at a wavelength at which the intensity is different in the sun and the shade.

$$C_2 = \sum_n w_n \left\| \frac{\sum_\lambda S_{shade}(\lambda) * C_n(\lambda)}{\sum_\lambda S_{sun}(\lambda) * C_n(\lambda)} - \frac{I_n^{shade}}{I_n^{sun}} \right\|$$ [Numerical expression 8]

In the above explanation, multi-wavelength camera is assumed to be used, and the number of wavelengths n is not limited. However, even when a color image including three wavelength components is used (that is, n=1, 2, 3), the determination can be made in the completely same manner. It should be noted that it is not necessary to use all the obtained wavelength information. Only some pieces of wavelength information mainly including blue-like colors and red-like colors in which a ratio of contents between the sun and the shade is relatively different may be used. Further, when the amount of light incident on the imaging device and the pixel value are in nonlinear relationship, comparison can be made in view of the non-linear characteristics.

Figure 8:
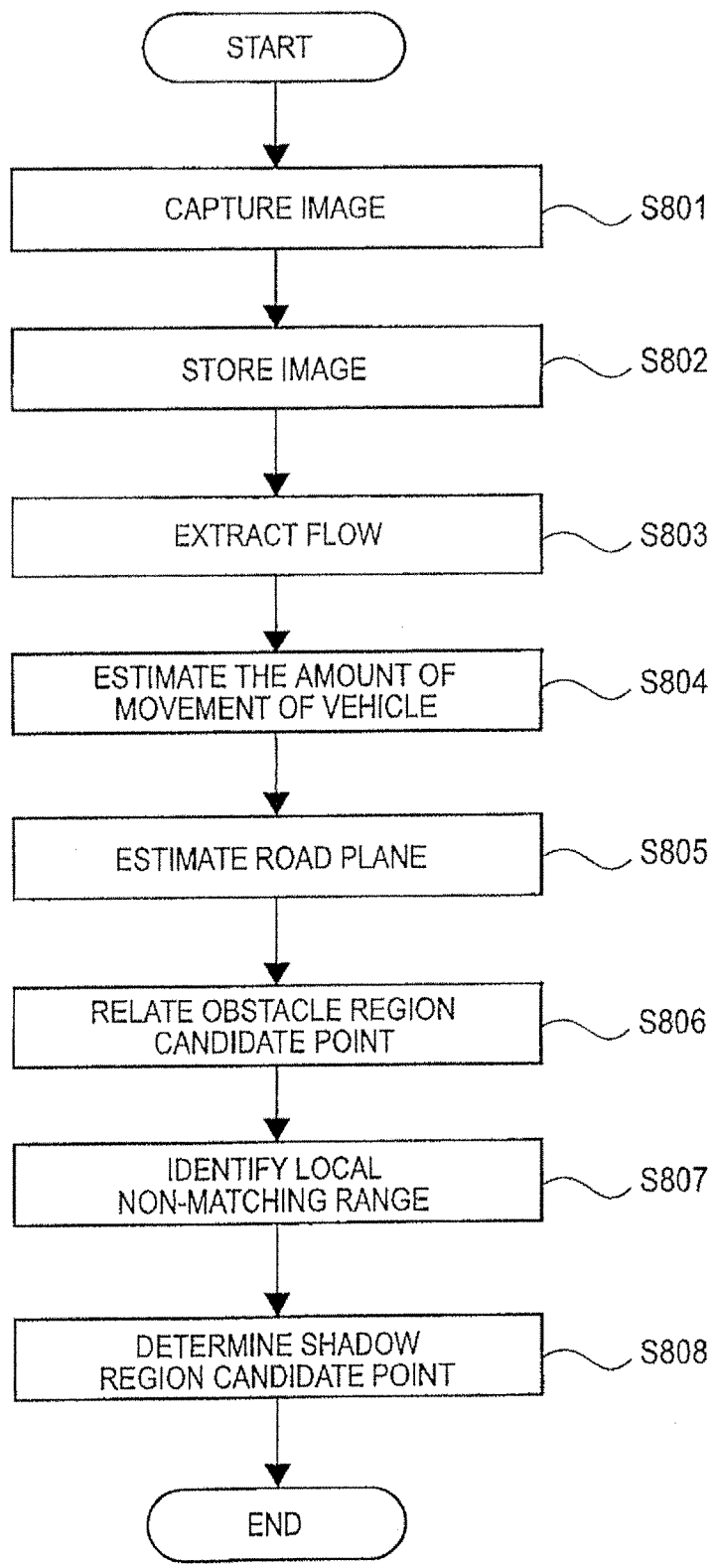
FIG. 8 A flowchart illustrates operation of the first embodiment.

Subsequently, operation of the present embodiment will be explained with reference to FIGS. 2 and 8. FIG. 8 is a flowchart for explaining operation of the present embodiment. First, the car-mounted imaging module (image capturing module) 101 captures, from moment to moment, spectral images of a road and therearound on which there may be obstacles, and outputs the spectral images to the image storage module 102 (step S801). The image storage module 102 stores the captured images (step S802). Subsequently, the flow extraction module 103 looks up two images, i.e., an image at the earlier time and an image at the current time, stored in the image storage module 102, and obtains flow of pixels (step S803).

The vehicle movement amount estimation module 104 estimates the amount of movement of the vehicle from the extracted flow of the pixels (step S804). The road plane estimation module 105 estimates an expression representing the road plane on the basis of the amount of movement of the vehicle and the extracted flow of the pixels (step S805). Subsequently, the obstacle candidate point relating module 106 assumes that the pixels in the image at the earlier time correspond to the road plane in the real world based on the flow of the pixels, the amount of movement of the vehicle, and the road plane, and extracts a corresponding point in the image at the current time (step S806).

The local non-matching range identifying module 107 compares the partial images pixel by pixel in which points of the two images are centered respectively, and identifies the non-matching range (step S807). Finally, the obstacle determining module 108 inspects proportional relation between the difference between the two spectral images corresponding to the non-matching range and the spectral characteristics of sunshine in the sun and the shade. When it is not in the proportional relation, the obstacle determining module 108 determines that the pixel is a moving or stationary obstacle. When it is not in the proportional relation, the obstacle determining module 108 determines that the point in the image is a moving or stationary obstacle. When it is in the proportional relation, the obstacle determining module 108 determines that the point in the image corresponds to a shadow moving on the road surface of the road and is not an obstacle (step S808).

Figure 9:
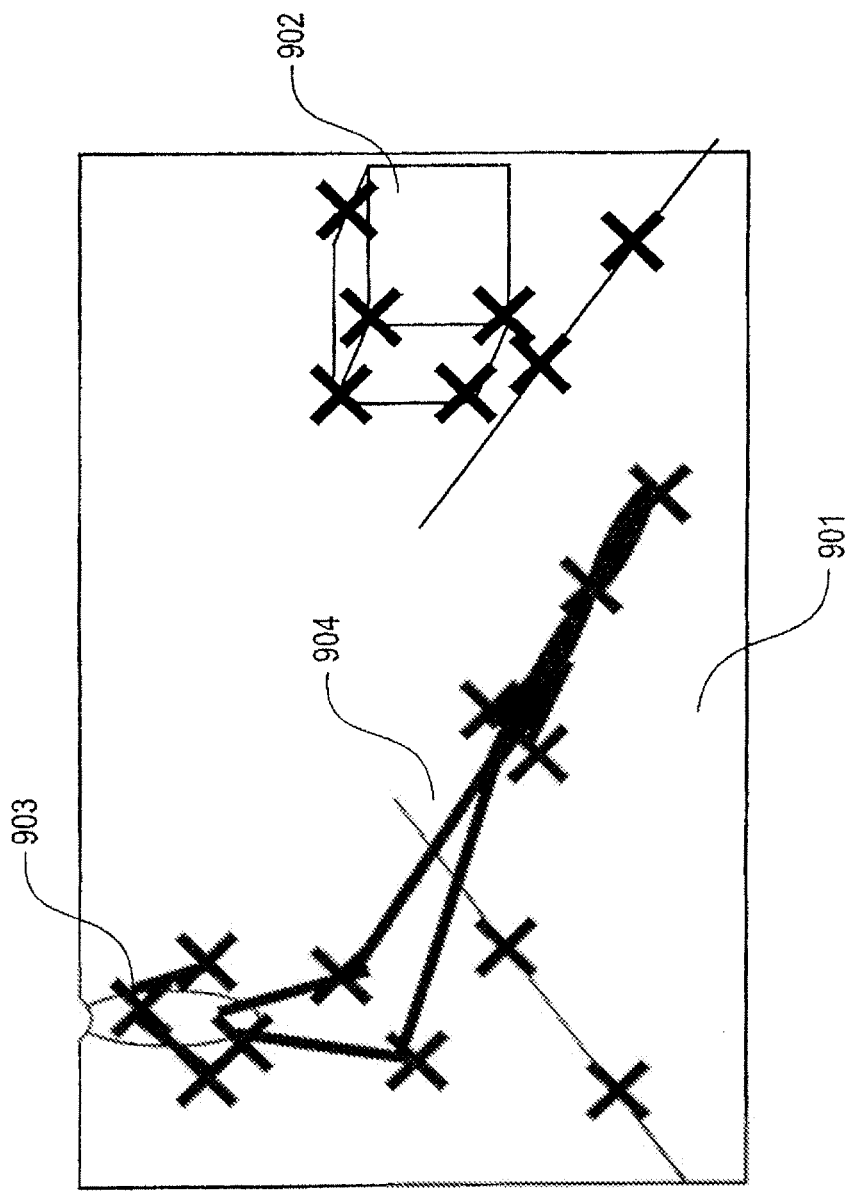
FIG. 9 A figure illustrates an example of an image taken by the imaging module.

According to the present embodiment, the points in the image corresponding to the moving shadow of the moving object are not falsely determined to be the obstacle. Therefore, for example, when an image as shown in FIG. 9 is obtained, points corresponding to a stationary obstacle 902 and a pedestrian 903 are determined to correspond to an obstacle. However, points corresponding to a shadow 904 of a pedestrian 903 do not actually obstruct the passage of the vehicle. Therefore, when the obstacle detection device is used in an obstacle alarm apparatus and the like, the shadow 904 is not falsely determined to be an obstacle, and false alarm can be prevented. It should be noted that ""X"" marks in FIG. 9 indicate pixel positions used for determination in the processing after the obstacle candidate point relating module 106.

In the above embodiment, the amount of movement of the vehicle is defined as the amount of movement to the state at the current time with respect to the state at the earlier time, and the corresponding point in the image at the current time is obtained on the basis of the point in the image at the earlier time in the association process performed by the obstacle candidate point relating module. However, it is perfectly alright to use the image and the state at the current time as the reference in both of the processings. When both of the processings use different references, it is necessary to change the calculating formula of the corresponding pixel used in the obstacle candidate point relating module 106.

Figure 15:
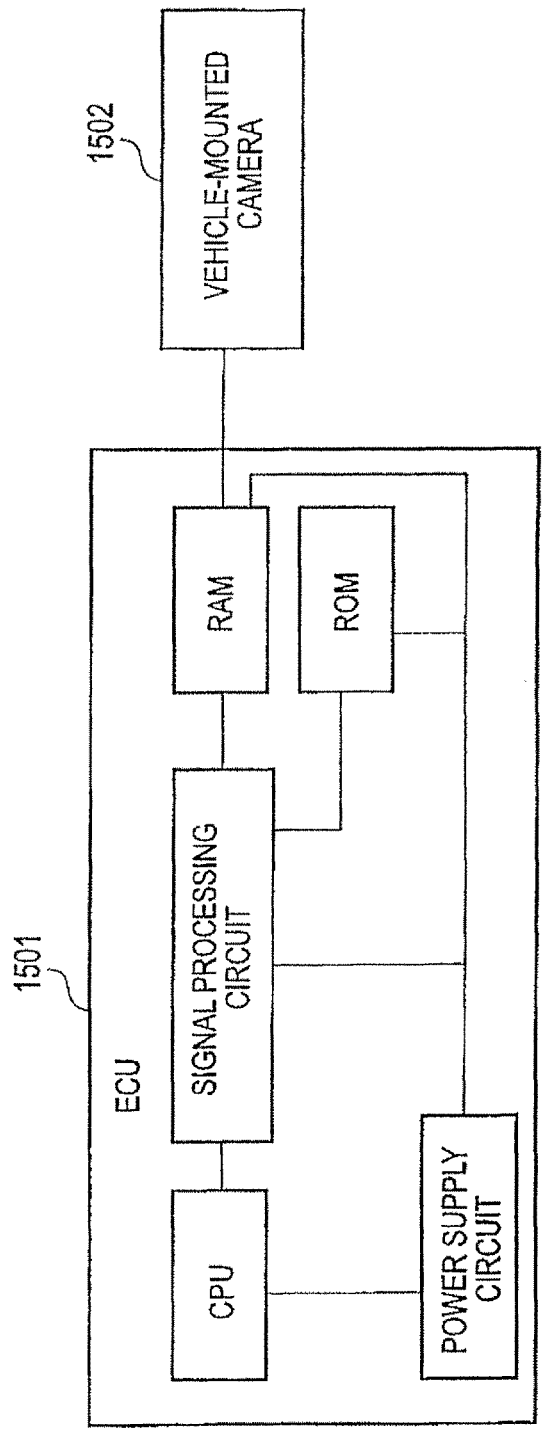
FIG. 15 A figure illustrates an embodiment including a vehicle-mounted camera and an ECU of the obstacle detection device according to the present invention.

In the obstacle detection device according to the present invention, each module is constituted by hardware such as a dedicated IC. The imaging module includes an optical system for image capturing process. For example, an electronic control unit (ECU) 1501 and a vehicle-mounted camera 1502 may be connected via a network as shown in FIG. 15, and a module other than the imaging module as shown in FIG. 2 may achieve the same functions with software. The ECU 1501 controls the entire apparatus, and is constituted by, for example, a CPU, a RAM, a ROM, a signal processing circuit, and a power supply circuit.

The same functions achieved with software by the module other than the imaging module as shown in FIG. 2 can be achieved by causing the ECU 1501 to read and execute a computer program capable of achieving the functions and determination logics shown in the flowchart used in the explanation thereof except for the functions of the imaging module 101. Alternatively, the functions executed by the ECU 1501 may be made into hardware, and a microcomputer may be made. Still alternatively, some of the functions may be achieved with hardware, and the same functions may be achieved by cooperative operation of the hardware and software programs. This is also applicable to the embodiments described below.

Second Embodiment

Figure 10:
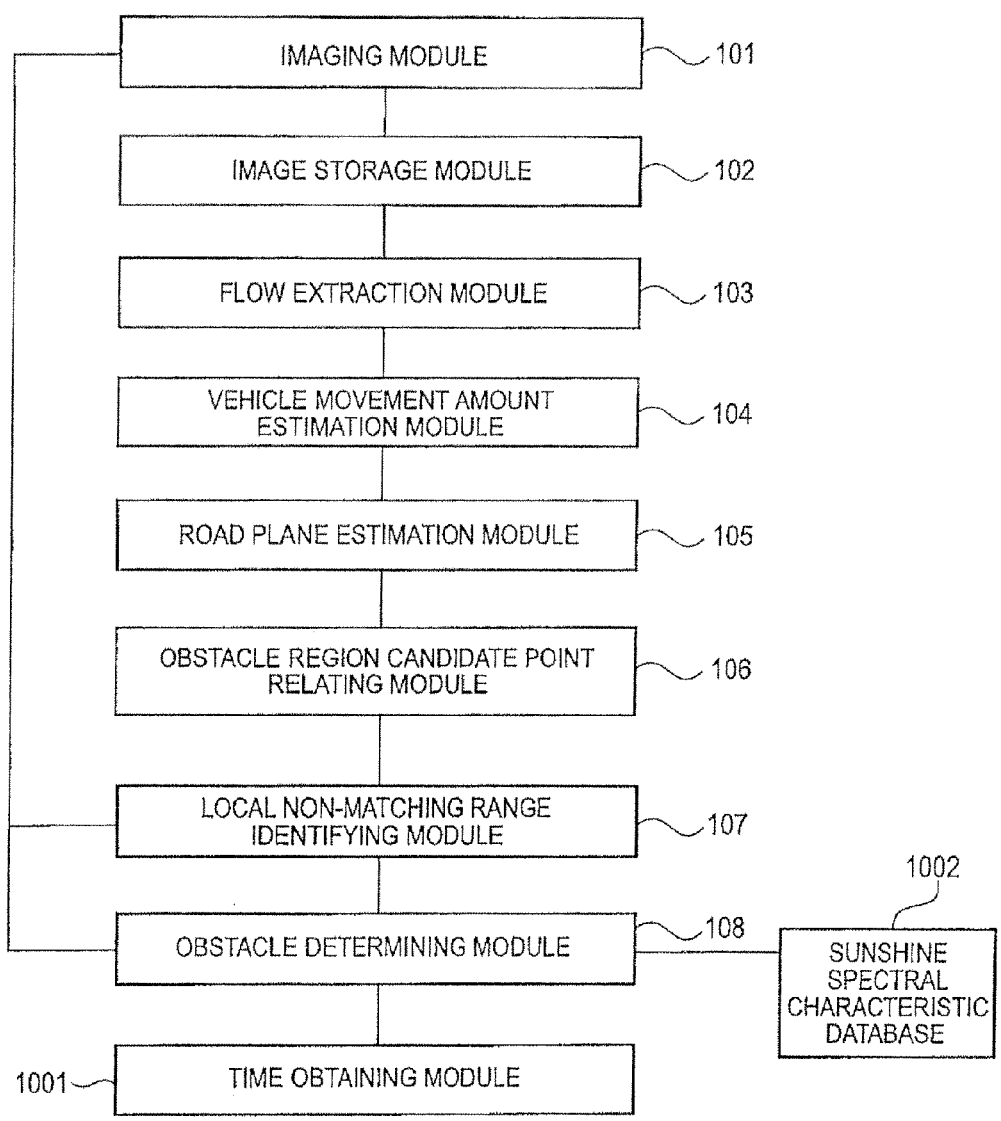
FIG. 10 A block diagram illustrates the second embodiment of the present invention.

Subsequently, the second embodiment of the present invention will be explained. FIG. 10 is a block diagram illustrating the configuration of the present embodiment. In FIG. 10, the same portions as those of FIG. 2 are denoted with the same reference numerals. The present embodiment includes not only the apparatus configuration of FIG. 2 but also a time obtaining module 1001 for obtaining current time information and a sunshine spectral characteristic database 1002 indicating relationship between times and wavelength properties (spectral characteristics) of the sunlight near the ground. The time obtaining module 1001 corresponds to a current time obtaining unit.

The modules from the imaging module 101 to the obstacle relating module 107 are the same as those explained in the first embodiment, and detailed description thereabout is omitted. The time obtaining module 1001 outputs the current time. Since the spectral characteristic of the sunlight near the ground changes with the time, the wavelength property of the light source can be grasped more accurately by using the time information as explained later.

The sunshine spectral characteristic database 1002 indicating the relationship between the times and the spectral characteristics of the sunlight near the ground stores the relationship between the times and the wavelength properties of the sunlight. More specifically, for example, the sunshine spectral characteristic database 1002 stores calculation expressions, constants, and the like of Bird model, i.e. a model expression giving spectrum of the sunlight near the ground. It is perfectly alright to use other model expressions capable of indicating relationship between times and wavelength properties of the sunlight near the ground.

The obstacle determining module 108 applies the time information obtained by the time obtaining module 1001 to the sunshine spectral characteristic database 1002, obtains spectral characteristics Ssun ($\lambda$), Sshade ($\lambda$) of the sunlight in the sun and the shade corresponding to the current time for use in the determining processing, and uses the spectral characteristics Ssun ($\lambda$), Sshade ($\lambda$) to perform the determining processing.

Figure 11:
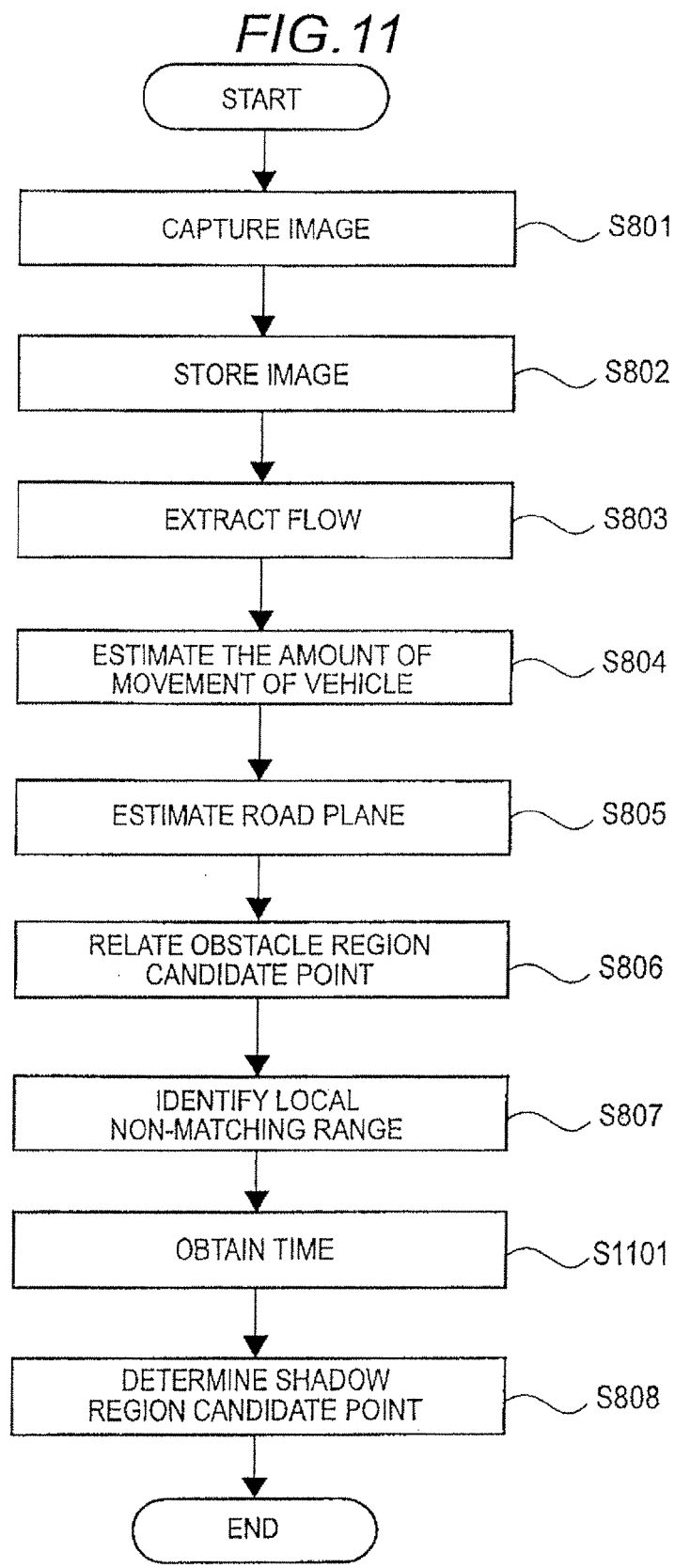
FIG. 11 A flowchart illustrates operation of the second embodiment.

Subsequently, operation of the present embodiment will be explained with reference to a flowchart shown in FIG. 11. Step S801 to step S807 in FIG. 11 are completely the same as the processing from step S801 to step S807 in FIG. 8. In the present embodiment, after step S807, the time obtaining module 1001 obtains the time information (step S1101). The obstacle determining module 108 applies the time information obtained in step S1101 to the sunshine spectral characteristic database 1002, obtains the spectral characteristics Ssun ($\lambda$), Sshade ($\lambda$) of the sunlight in the sun and the shade, and uses the spectral characteristics Ssun ($\lambda$), Sshade ($\lambda$) to determine whether a point in question corresponds to the shadow region of the moving object or corresponds to the obstacle, like the above explanation about the embodiment.

According to the present embodiment, the spectral characteristics Ssun ($\lambda$), Sshade ($\lambda$) of the sunlight in the sun and the shade changing with the time can be obtained more accurately according to the current time, and the accuracy in the determination made by the obstacle determining module 108 can be improved.

Third Embodiment

Figure 12:
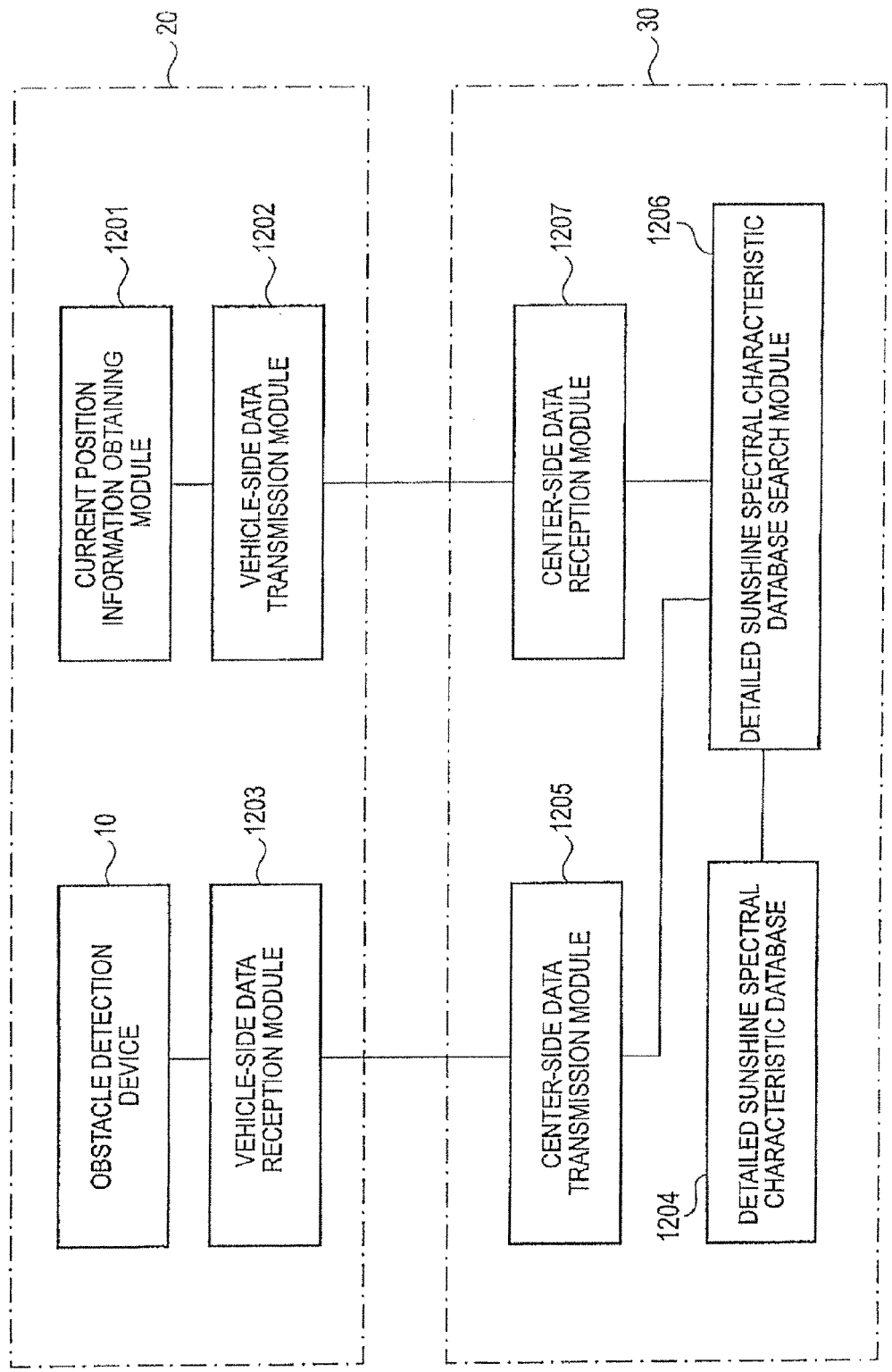
FIG. 12 A block diagram illustrates an embodiment of an obstacle detection system according to the present invention.

Subsequently, an embodiment of an obstacle detection system using the obstacle detection device according to the present invention will be explained. FIG. 12 is a block diagram illustrating a configuration of an embodiment of the obstacle detection system including an information center internal apparatus and a vehicle-mounted apparatus according to the present invention. As shown in FIG. 12, a vehicle-mounted apparatus 20 includes not only the apparatus configuration of the obstacle detection device 10 in FIG. 2 but also a current position information obtaining module 1201 for obtaining a current position, and a vehicle-side data transmission module 1202 for transmitting the current position information to an information center internal apparatus 30 explained later, and a vehicle-side data reception module 1203 for obtaining wavelength property information about the sunlight from the information center internal apparatus 30.

The information center internal apparatus 30 includes a detailed sunshine spectral characteristic database 1204 for storing calculation expressions and constants for giving spectral characteristics of the sunlight in the sun and the shade on the ground and data about weather conditions affecting the spectral characteristics of the sunlight and a center-side data reception module 1207 for receiving position information from the vehicle-mounted apparatus 20. In addition, the information center internal apparatus 30 includes a detailed sunshine spectral characteristic database search module 1206 for searching the spectral characteristics of the sunlight in the sun and the shade corresponding to the position information received by the vehicle-mounted apparatus 20 and a center-side data transmission module 1205 for transmitting the spectral characteristic information searched by the detailed sunshine spectral characteristic database search module 1206 to the vehicle-mounted apparatus 20.

Subsequently, the vehicle-mounted apparatus 20 will be explained in detail. The current position information obtaining module 1201 uses a GPS and the like to obtain the position information where the vehicle is located. The vehicle-side data transmission module 1202 transmits the current position information obtained by the current position information obtaining module 1201 as well as the information capable of identifying the vehicle to the information center internal apparatus. Transmission timing is, for example, transmission with a regular time interval. This is because even though the spectral characteristics of the sunlight are affected by the position of the vehicle and the atmospheric condition, it is considered that it rarely occurs that the position and the state of atmosphere change to result in a great change in the spectral characteristics in a short time.

After the vehicle-side data transmission module 1202 transmits the current position information, the vehicle-side data reception module 1203 receives the spectral characteristic data of the sunlight in the sun and the shade from the information center internal apparatus, and outputs the data to the obstacle determining module 108 of the obstacle detection device 10. However, when the spectral characteristic data cannot be received immediately after the transmission of the data, the vehicle-side data reception module 1203 may not wait for the data and may output, to the obstacle determining module 108, information indicating the reception state while new data are not received, and terminate the reception processing at the current time. In such case, the vehicle-side data reception module 1203 may retry reception in a subsequent time again. The functions from the imaging module (image capturing module) 101 to the obstacle determining module 108 are the same as those in the configuration as shown in FIG. 2.

Subsequently, the information center internal apparatus 30 will be explained. As described above, the detailed sunshine spectral characteristic database 1204 stores calculation expressions and constants for giving spectral characteristics of the sunlight in the sun and the shade near the ground and data about weather conditions affecting the spectral characteristics of the sunlight. For example, the detailed sunshine spectral characteristic database 1204 stores not only model expressions for giving spectrum of the sunlight near the ground but also current values of parameters indicating the state of atmosphere in association with various positions. An example of model expression includes Bird model. Examples of parameters indicating the state of atmosphere include turbidity index of the atmosphere at the wavelength of 500 nm, thickness of ozone, and precipitable water.

The center-side data reception module 1207 receives information for identifying the vehicle and the position information of the vehicle from the vehicle-mounted apparatus. The detailed sunshine spectral characteristic database search module 1206 looks up the parameters indicating the state of atmosphere associated with the nearest position to the received position information of the vehicle, and obtains the current time from the clock in the detailed sunshine spectral characteristic database search module 1206. Then, these parameters are applied to the model expression giving spectrum of the sunlight near the ground, and the detailed sunshine spectral characteristic database search module 1206 searches, in the detailed sunshine spectral characteristic database 1204, spectral characteristic data of the sunlight in the sun and the shade corresponding to the current time near the position where the vehicle transmitting the data resides.

The center-side data transmission module 1205 transmits the spectral characteristic data of the sunlight in the sun and the shade searched by the detailed sunshine spectral characteristic database search module 1206 to the vehicle that transmitted the data received by the center-side data reception module 1207.

Figure 13:
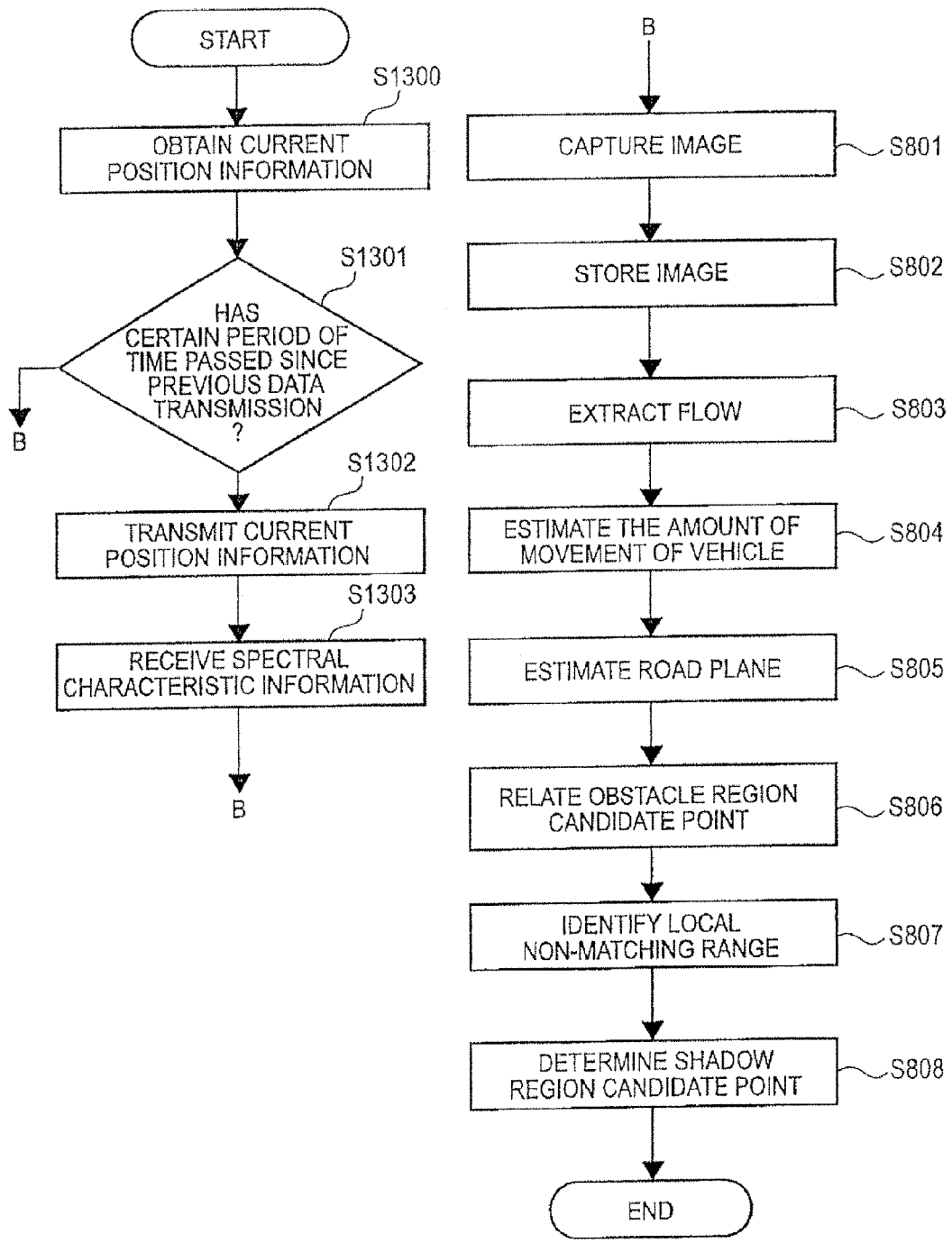
FIG. 13 A flowchart illustrates operation of a vehicle-mounted apparatus of FIG. 12.
Figure 14:
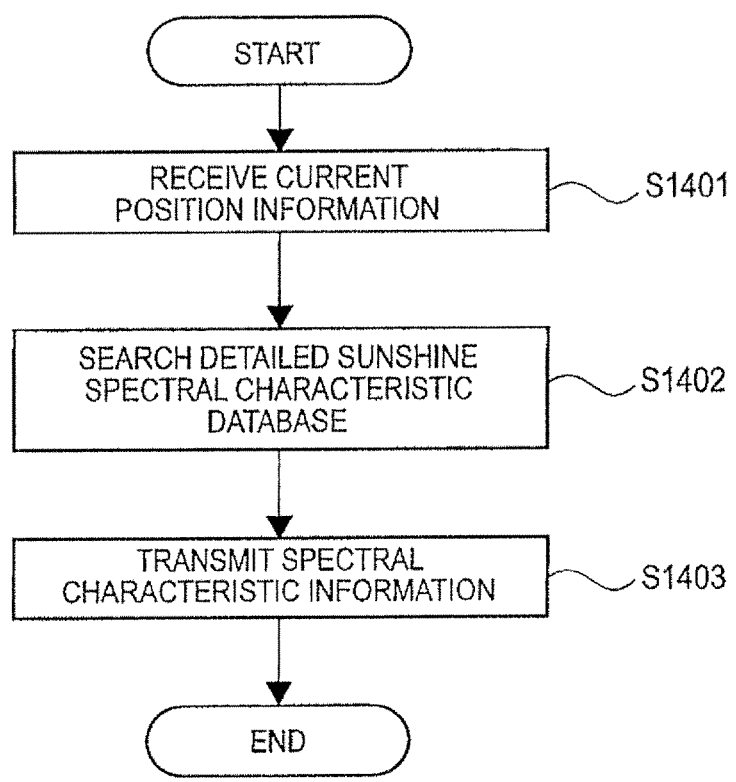
FIG. 14 A flowchart illustrates operation of an information center internal apparatus of FIG. 12.

Subsequently, operation of the present embodiment will be explained with reference to FIGS. 13 and 14. FIG. 13 is a flowchart illustrating operation of the vehicle-mounted apparatus 20. FIG. 14 is a flowchart illustrating operation of the information center internal apparatus 30.

First, operation of the vehicle-mounted apparatus 20 will be explained with reference to FIG. 13. The current position information obtaining module 1201 uses a GPS and the like to obtain the current position (step S1300). Subsequently, the vehicle-side data transmission module 1202 determines whether a certain period of time has passed since the current position information is transmitted to the information center internal apparatus 30 (step S1301). When the certain period of time has passed, the current position information is output to the information center internal apparatus 30 (step S1302).

After the vehicle-side data transmission module 1202 transmits the data, the vehicle-side data reception module 1203 receives the spectral characteristic data of the sunlight from the information center internal apparatus 30, and outputs the data to the obstacle determining module 108 of the obstacle detection device 10 (step S1303). On this occasion, if the spectral characteristic data of the sunlight are not immediately transmitted from the information center, the vehicle-side data reception module 1203 may not wait for the data and may output, to the obstacle determining module 108, information indicating the reception state, and retry reception in a subsequent time again.

The processings from the subsequent image capturing step (step S801) to the obstacle determining step (step S808) are basically the same as the processings of the flowchart as shown in FIG. 8. What is slightly different is that when new spectral characteristic data are obtained at the current time from the vehicle-side data reception module 1203 in the obstacle determining step, the obtained data are used for the determining processing, and the obtained data are still used until new spectral characteristic data are obtained. When the vehicle-side data reception module 1203 is not in the reception waiting state, or at a time when the spectral characteristic data are not received, the previously received spectral characteristic data are used to perform the determining processing. The method for determining a point is an obstacle or not using the spectral characteristic data is the same as that explained with reference to FIGS. 10 and 11.

Subsequently, operation of the information center internal apparatus 30 will be explained with reference to FIG. 14. The center-side data reception module 1207 receives the position information of the vehicle transmitted from the vehicle-mounted apparatus and the information capable of identifying the vehicle (step S1401). The detailed sunshine spectral characteristic database search module 1206 uses the current time and the position information of the vehicle transmitted from the vehicle-mounted apparatus 20 to search the detailed sunshine spectral characteristic database 1204, and searches/estimates the spectral characteristic data of the sunlight corresponding to the current time near the corresponding vehicle position (step S1402). The center-side data transmission module 1205 transmits the spectral characteristic data obtained by the detailed sunshine spectral characteristic database search module 1206 to the vehicle apparatus 20 identified based on the received information (step S1403).

According to the present embodiment, the spectral characteristic data of the sunlight in view of the state of atmosphere near the current position can be obtained from the information center internal apparatus 30. Therefore, the accuracy of the determining processing performed by the obstacle determining module 108 can be enhanced.

In the above explanation about operation, the basic obstacle detection step (step S801 to step S807) is executed after the transmission/reception step of information to/from the information center internal apparatus 30 (from step S1300 to step S1303). Alternatively, these two processings can be executed in the opposite order since these two processings are basically independent from each other. Further, in the embodiment of FIGS. 10 and 11, not only the current time but also the spectral characteristic data corresponding to the position information of the vehicle may be obtained to perform the determining processing with a high degree of accuracy.

The obstacle detection device according to the above embodiment is achieved with hardware such as a dedicated IC. Alternatively, the same functions can be achieved by causing a computer to read and execute a program for causing the computer to function as the obstacle detection device from a computer-readable recording medium. The obstacle detection method according to the above embodiment is achieved with hardware. Alternatively, the same functions can be achieved by causing a computer to read and execute a program for executing the method from a computer-readable recording medium such as a CD-ROM, a DVD, and a flash memory.

In each of the embodiments explained above, the obstacle region candidate point relating module assumes that a pixel in the image corresponds to a point on the road surface, and associates the pixels between the images at two times on the basis of the amount of movement of the vehicle, the road plane, and the flow of the image estimated. When the pixel corresponds to the shadow of the vehicle or the moving object therearound appearing on the road surface, the ratio of intensities of the pixel values of the spectral images between the two images is approximately the same as the ratio of the spectral characteristics of the sunshine in the sun and the shade. Therefore, when the ratio of intensities is approximately the same as the ratio of the spectral characteristics, the obstacle determining module does not determine that the pixel in question is a point corresponding to the obstacle. Only when the ratio of intensities is not approximately the same as the ratio of the spectral characteristics, the obstacle determining module determines that the pixel in question is a point corresponding to the obstacle.

As described above, the obstacle detection device based on the motion stereo method does not falsely determine that the shadow of the moving object appearing on the road surface is an obstacle. This is because the obstacle detection device based on the motion stereo method makes use of the fact that, when pixels in the images obtained at two times are associated with each other on the basis of the amount of movement of the vehicle estimated according to the motion stereo method on the assumption that the pixel corresponds to the road plane in the real world, difference of pixels values caused by difference of the spectral characteristics of the sunlight in the sun and the shade is observed in a portion around pixels corresponding to the shadow of the moving object appearing on the road plane in contrast to a portion around pixels corresponding to the obstacle, and means for distinguishing pixels corresponding to the shadow of the moving object and pixels corresponding to the obstacle is introduced into the obstacle detection device based on the motion stereo method.

In each of the embodiments explained above, the "vehicle" means a vehicle having two or more wheels such as a motorcycle, a three-wheel automobile, and a four-wheel automobile, or a train.

The present invention has been hereinabove explained using typical embodiments. However, the present invention may be embodied in other various forms without departing from the spirit and essential characteristics thereof, which are defined by the claims of the present application. The described embodiments are therefore to be considered only as illustrative, not as restrictive. The scope of the present invention is indicated by the appended claims, and is not restricted by the specification or abstract. Furthermore, all modifications and alterations which come within the meaning and range of equivalency of the claims are to be embraced within the scope of the present invention.

The present application claims priority based on Japanese Patent Application No. 2009-187271 filed on Aug. 12, 2009, and all the contents disclosed in Japanese Patent Application No. 2009-187271 are included in the contents of the present application.

Some or all of the above embodiments may be described as shown in supplementary notes below, but are not limited to the configurations below.

(Supplementary Note 1)

An obstacle detection device for detecting an obstacle around a vehicle from a spectral image obtained by an imaging unit mounted on the vehicle, the obstacle detection device including:

an image storage unit for storing an image provided by the imaging unit;

a flow extraction unit for extracting a flow of a pixel from images stored at two different times in the image storage unit;

a vehicle movement amount estimation unit for estimating an amount of movement of the vehicle in a real world based on the extracted flow;

a road plane estimation unit for estimating a position of a road plane based on the extracted flow and the amount of movement of the vehicle;

an obstacle candidate point relating unit relating pixels in images at the two times by using a pixel in an image at an earlier time as a reference, by assuming that the pixel corresponds to the road plane in the real world, and by extracting a corresponding pixel at a current time based on the amount of movement of the vehicle;

a non-matching range identifying unit for comparing, pixel by pixel, partial images having centers at obstacle candidate points related between the pixels in the images at the two times, and identifying a range in which pixel values are different as a non-matching range; and an obstacle determining unit for comparing the pixel values in the spectral images at the two times corresponding to the non-matching range, and determining whether the obstacle candidate point is a point corresponding to a shadow on the road plane or a point corresponding to an actual obstacle.

(Supplementary Note 2)

The obstacle detection device according to appendix 1, wherein an obstacle candidate point relating unit relates a pixel producing a flow which is not consistent with the amount of movement of the vehicle and the road plane.

(Supplementary Note 3)

The obstacle detection device according to appendix 1, wherein the obstacle candidate point relating unit relates a pixel at which the flow does not satisfy epipolar constraint when the amount of movement of the vehicle is assumed.

(Supplementary Note 4)

The obstacle detection device according to any one of appendixes 1 to 3, further including:

a current time obtaining unit for obtaining a current time; and a sunshine spectral characteristic database for storing relationship between a time and spectral intensities of sunshine in sun and shade, wherein the obstacle determining unit obtains the spectral intensities of sunshine in the sun and the shade from the sunshine spectral characteristic database corresponding to the current time of the time obtaining unit, and determines whether the obstacle candidate point corresponds to the obstacle or not, based on spectral characteristic thereof.

(Supplementary Note 5)

An obstacle detection method for detecting an obstacle around a vehicle from a spectral image obtained by an imaging unit mounted on the vehicle, the obstacle detection method including:

causing an image storage unit to store a image provided by the imaging unit;

extracting a flow of a pixel from images stored at two different times in the image storage unit;

estimating an amount of movement of the vehicle in a real world based on the extracted flow;

estimating a position of a road plane based on the extracted flow and the amount of movement of the vehicle;

relating pixels in images at the two times by using a pixel in an image at an earlier time as a reference, by assuming that the pixel corresponds to the road plane in the real world, and by extracting a corresponding pixel at a current time based on the amount of movement of the vehicle;

comparing, pixel by pixel, partial images having centers at obstacle candidate points related between the pixels in the images at the two times, and identifying a range in which pixel values are different as a non-matching range; and comparing the pixel values in the spectral images at the two times corresponding to the non-matching range, and determining whether the obstacle candidate point is a point corresponding to a shadow on the road plane or a point corresponding to an actual obstacle.

(Supplementary Note 6)

The obstacle detection method according to appendix 5, wherein when in relating the pixels in the images at the two times, a pixel producing a flow not in consistent with the amount of movement of the vehicle and the road plane is related.

(Supplementary Note 7)

The obstacle detection method according to appendix 5, wherein in relating the pixels in the images at the two times, a pixel is associated at which the flow does not satisfy epipolar constraint when the amount of movement of the vehicle is assumed.

(Supplementary Note 8)

The obstacle detection method according to any one of appendixes 5 to 7, wherein in determining whether the obstacle candidate point is a point corresponding to the shadow on the road plane or a point corresponding to the actual obstacle, spectral intensities of sunshine in sun and shade corresponding to a current time are obtained from a sunshine spectral characteristic database storing relationship between a time and the spectral intensities of sunshine in the sun and the shade, and a determination is made as to whether the obstacle candidate point corresponds to the obstacle or not based on spectral characteristic thereof.

(Supplementary Note 9)

An obstacle detection system including:
a vehicle-mounted apparatus having the obstacle detection device according to any one of appendixes 1 to 4 mounted thereon; and
an information center apparatus for transmitting and receiving data to/from the vehicle-mounted apparatus,
the vehicle-mounted apparatus including:
a vehicle-side data transmission unit for transmitting current position information to the information center apparatus; and
a vehicle-side data reception unit for receiving spectral characteristic data from the information center apparatus,
the information center apparatus including:
a detailed sunshine spectral characteristic database for storing relationship between spectral characteristics of sunshine in sun and shade in association with position information and a time;
a center-side data reception unit for receiving the current position information from the vehicle-side data transmission unit of the vehicle-mounted apparatus;
a sunshine spectral characteristic obtaining unit for searching spectral characteristic data of sunshine in the sun and the shade corresponding to the position information and the current time from the detailed sunshine spectral characteristic database; and
a center-side data transmission unit for transmitting the spectral characteristic data obtained by the sunshine spectral characteristic obtaining unit to the vehicle-mounted apparatus,
wherein the obstacle determining unit determines whether the obstacle candidate point corresponds to an obstacle or not, based on the spectral characteristic data received by the vehicle-side data reception unit.

(Supplementary Note 10)

A computer-readable information recording medium storing a program for causing a computer to function as
a flow extraction unit for extracting a flow of a pixel from images stored at two different times in an image storage unit;
a vehicle movement amount estimation unit for estimating an amount of movement of the vehicle in a real world based on the extracted flow;
a road plane estimation unit for estimating a position on a road plane based on the extracted flow and the amount of movement of the vehicle;
an obstacle candidate point relating unit relating pixels in images at the two times by using a pixel in an image at an earlier time as a reference, by assuming that the pixel corresponds to the road plane in the real world, and by extracting a corresponding pixel at a current time based on the amount of movement of the vehicle;
a non-matching range identifying unit for comparing, pixel by pixel, partial images having centers at obstacle candidate points related between the pixels in the images at the two times, and identifying a range in which pixel values are different as a non-matching range; and
an obstacle determining unit for comparing the pixel values in the spectral images at the two times corresponding to the non-matching range, and determining whether the obstacle candidate point is a point corresponding to a shadow on the road plane or a point corresponding to an actual obstacle.

{Reference Signs List}

| | |
|---|---|
| 101 | imaging module |
| 102 | image storage module |
| 103 | flow extraction module |
| 104 | vehicle movement amount estimation module |
| 105 | road plane estimation module |
| 106 | obstacle candidate point relating module |
| 107 | local non-matching range identifying module |
| 108 | obstacle determining module |
| 201 | image capturing image |
| 202 | road surface |
| 203 | pedestrian |
| 204 | pedestrian's shadow |
| 301 | road surface |
| 302 | stationary obstacle |
| 303 | moving obstacle (pedestrian) |
| 304 | shadow of obstacle |
| 401 | image at the earlier time |
| 402 | pixel on image 401 |
| 403 | focal length f of imaging module |
| 404 | road plane |
| 405 | image at the current time |
| 406 | origin point |
| 407 | intersection point between road plane 404 and straight line passing through origin point 406 and point 402 |
| 408 | pixel in image at the current time corresponding to pixel 402 |
| 501 | points on road surface corresponding to pixel 402, pixel 408 502 stationary obstacle |
| 503 | corner point of stationary obstacle |
| 504 | intersection point between road plane and straight line connecting pixel 402 and corner point 503 |
| 505 | point on stationary obstacle 502 |
| 506 | parietal region of pedestrian |
| 507 | point on road surface corresponding to pixel 402 and pixel 408 in reality |
| 508 | position of pedestrian at earlier time |
| 509 | position of pedestrian at current time |
| 510 | position of shadow at earlier time |
| 511 | position of shadow at current time |
| 601 | partial image extracted from image at the earlier time |
| 602 | partial image extracted from image at the current time |
| 603 | non-matching range |
| 604 | range corresponding to road surface |
| 701 | partial image extracted from image at the earlier time |
| 702 | partial image extracted from image at the current time |
| 703 | non-matching range |
| 704 | range corresponding to road surface |
| 901 | road surface |
| 902 | stationary obstacle |
| 903 | pedestrian |
| 904 | shadow |
| 1001 | time obtaining module |
| 1002 | sunshine spectral characteristic database |
| 1201 | current position information obtaining module |
| 1202 | vehicle-side data transmission module |
| 1203 | vehicle-side data reception module |
| 1204 | detailed sunshine spectral characteristic database |
| 1205 | center-side data transmission module |
| 1206 | detailed sunshine spectral characteristic database search module |
| 1207 | center-side data reception module |
| 1501 | ECU |
| 1502 | vehicle-mounted camera |

The invention claimed is:

1. An obstacle detection device for detecting an obstacle around a vehicle from a spectral image obtained by an imaging unit mounted on the vehicle, the obstacle detection device comprising:
an image storage unit for storing an image provided by the imaging unit;
a flow extraction unit for extracting a flow of a pixel from images stored at two different times in the image storage unit, the two different times being a current time and an earlier time than the current time;

a vehicle movement amount estimation unit for estimating an amount of movement of the vehicle in a real world based on the flow;

a road plane estimation unit for estimating a position of a road plane based on the flow and the amount of movement of the vehicle;

an obstacle candidate point relating unit relating pixels in images at the two different times by using a pixel in an image at the earlier time as a reference, by assuming that the pixel corresponds to the road plane in the real world, and by extracting a corresponding pixel at the current time based on the amount of movement of the vehicle;

a non-matching range identifying unit for comparing, pixel by pixel, partial images having centers at obstacle candidate points related between the pixels in the images at the two different times, and identifying a range in which pixel values are different as a non-matching range; and an obstacle determining unit for comparing the pixel values in spectral images at the two different times corresponding to the non-matching range, and determining whether the obstacle candidate point comprises a point corresponding to a shadow on the road plane or a point corresponding to an actual obstacle.

2. The obstacle detection device according to claim 1, wherein each of the pixels which the obstacle candidate point relating unit relates comprises the pixel producing the flow which is not consistent with the amount of movement of the vehicle and the road plane.

3. The obstacle detection device according to claim 1, wherein each of the pixels which the obstacle candidate point relating unit relates comprises the pixel at which the flow does not satisfy epipolar constraint when the amount of movement of the vehicle is assumed.

4. The obstacle detection device according to claim 1, further comprising:

a current time obtaining unit for obtaining the current time; and a sunshine spectral characteristic database for storing a relationship between a time and spectral intensities of sunshine in a sun and a shade, wherein the obstacle determining unit obtains the spectral intensities of sunshine in the sun and the shade from the sunshine spectral characteristic database corresponding to the current time of the current time obtaining unit, and determines whether the obstacle candidate point corresponds to the obstacle based on a spectral characteristic thereof.

5. The obstacle detection device according to claim 1, wherein said obstacle determining unit determines whether the obstacle candidate point corresponds to an actual obstacle based on a ratio of intensities of the pixel values of the spectral images at the two different times.

6. The obstacle detection device according to claim 5, wherein said ratio of intensities of the pixel values of the spectral images at the two different times is compared with a ratio of spectral characteristics of a sunshine.

7. The obstacle detection device according to claim 6, wherein said obstacle determining unit determines that the obstacle candidate point corresponds to an actual obstacle when a value of said ratio of intensities of the pixel values of the spectral images at the two different times is other than approximately equal to a value of said ratio of spectral characteristics of the sunshine.

8. An obstacle detection method for detecting an obstacle around a vehicle from a spectral image obtained by an imaging unit mounted on the vehicle, the obstacle detection method comprising:

causing an image storage unit to store an image provided by the imaging unit;

extracting a flow of a pixel from images stored at two different times in the image storage unit, the two different times being a current time and an earlier time than the current time;

estimating an amount of movement of the vehicle in a real world based on the flow;

estimating a position of road plane based on the flow and the amount of movement of the vehicle;

relating pixels in images at the two different times by using a pixel in an image at the earlier time as a reference, assuming that the pixel corresponds to the road plane in the real world, and extracting a corresponding pixel at the current time based on the amount of movement of the vehicle;

comparing, pixel by pixel, partial images having centers at obstacle candidate points related between the pixels in the images at the two different times, and identifying a range in which pixel values are different as a non-matching range; and comparing the pixel values in spectral images at the two different times corresponding to the non-matching range, and determining whether the obstacle candidate point comprises a point corresponding to a shadow on the road plane or a point corresponding to an actual obstacle.

9. The obstacle detection method according to claim 8, wherein when in relating the pixels in the images at the two times, each of the pixels comprises the pixel producing the flow not in consistent with the amount of movement of the vehicle and the road plane.

10. The obstacle detection method according to claim 8, wherein in relating the pixels in the images at the two times, each of the pixels is associated at which the flow does not satisfy epipolar constraint when the amount of movement of the vehicle is assumed.

11. The obstacle detection method according to claim 8, wherein in determining whether the obstacle candidate point comprises a point corresponding to the shadow on the road plane or a point corresponding to the actual obstacle, spectral intensities of sunshine in a sun and a shade corresponding to the current time are obtained from a sunshine spectral characteristic database storing relationship between a time and the spectral intensities of sunshine in the sun and the shade, and a determination is made as to whether the obstacle candidate point corresponds to the obstacle, based on a spectral characteristic thereof.

12. An obstacle detection system comprising:

a vehicle-mounted apparatus comprising the obstacle detection device according to claim 1 mounted thereon; and an information center internal apparatus for transmitting and receiving data to/from the vehicle-mounted apparatus, the vehicle-mounted apparatus including:

a vehicle-side data transmission unit for transmitting current position information to the information center internal apparatus; and a vehicle-side data reception unit for receiving spectral characteristic data from the information center internal apparatus, the information center internal apparatus including:

a detailed sunshine spectral characteristic database for storing relationship between spectral characteristics of sunshine in a sun and a shade in association with position information and a time;

a center-side data reception unit for receiving the current position information from the vehicle-side data transmission unit of the vehicle-mounted apparatus;

a sunshine spectral characteristic obtaining unit for searching spectral characteristic data of sunshine in the sun and the shade corresponding to the position information and the current time from the detailed sunshine spectral characteristic database; and a center-side data transmission unit for transmitting the spectral characteristic data obtained by the sunshine spectral characteristic obtaining unit to the vehicle-mounted apparatus, wherein the obstacle determining unit determines whether the obstacle candidate point corresponds to an obstacle, based on the spectral characteristic data received by the vehicle-side data reception unit.

13. A non-transitory computer-readable information recording medium storing a program for causing a computer to function as:

a flow extraction unit for extracting a flow of a pixel from images stored at two different times in an image storage unit, the two different times being a current time and an earlier time than the current time;

a vehicle movement amount estimation unit for estimating an amount of movement of the vehicle in a real world based on the flow;

a road plane estimation unit for estimating a position of road plane based on the flow and the amount of movement of the vehicle;

an obstacle candidate point relating unit relating pixels in images at the two times by using a pixel in an image at the earlier time as a reference, assuming that the pixel corresponds to the road plane in the real world, and extracting a corresponding pixel at the current time based on the amount of movement of the vehicle;

a non-matching range identifying unit for comparing, pixel by pixel, partial images having centers at obstacle candidate points relater between the pixels in the images at the two different times, and identifying a range in which pixel values are different as a non-matching range; and an obstacle determining unit for comparing the pixel values in spectral images at the two different times corresponding to the non-matching range, and determining whether the obstacle candidate point comprises a point corresponding to a shadow on the road plane or a point corresponding to an actual obstacle.

14. The obstacle detection device according to claim 2, further comprising:

a current time obtaining unit for obtaining the current time; and a sunshine spectral characteristic database for storing relationship between a time and spectral intensities of sunshine in a sun and a shade, wherein the obstacle determining unit obtains the spectral intensities of sunshine in the sun and the shade from the sunshine spectral characteristic database corresponding to the current time of the current time obtaining unit, and determines whether the obstacle candidate point corresponds to the obstacle based on a spectral characteristic thereof.

15. The obstacle detection device according to claim 3, further comprising:

a current time obtaining unit for obtaining the current time; and a sunshine spectral characteristic database for storing relationship between a time and spectral intensities of sunshine in a sun and a shade, wherein the obstacle determining unit obtains the spectral intensities of sunshine in the sun and the shade from the sunshine spectral characteristic database corresponding to the current time of the current time obtaining unit, and determines whether the obstacle candidate point corresponds to the obstacle, based on a spectral characteristic thereof.

16. The obstacle detection method according to claim 9, wherein in determining whether the obstacle candidate point is a point corresponding to the shadow on the road plane or a point corresponding to the actual obstacle, spectral intensities of sunshine in a sun and a shade corresponding to the current time are obtained from a sunshine spectral characteristic database storing relationship between a time and the spectral intensities of sunshine in the sun and the shade, and a determination is made as to whether the obstacle candidate point corresponds to the obstacle, based on a spectral characteristic thereof.

17. The obstacle detection method according to claim 10, wherein in determining whether the obstacle candidate point is a point corresponding to the shadow on the road plane or a point corresponding to the actual obstacle, spectral intensities of sunshine in a sun and a shade corresponding to the current time are obtained from a sunshine spectral characteristic database storing relationship between a time and the spectral intensities of sunshine in the sun and the shade, and a determination is made as to whether the obstacle candidate point corresponds to the obstacle, based on a spectral characteristic thereof.

18. An obstacle detection system comprising:

a vehicle-mounted apparatus comprising the obstacle detection device according to claim 2 mounted thereon; and an information center internal apparatus for transmitting and receiving data to/from the vehicle-mounted apparatus, the vehicle-mounted apparatus including:

a vehicle-side data transmission unit for transmitting current position information to the information center internal apparatus; and a vehicle-side data reception unit for receiving spectral characteristic data from the information center internal apparatus, the information center internal apparatus including:

a detailed sunshine spectral characteristic database for storing relationship between spectral characteristics of sunshine in a sun and a shade in association with position information and a time;

a center-side data reception unit for receiving the current position information from the vehicle-side data transmission unit of the vehicle-mounted apparatus;

a sunshine spectral characteristic obtaining unit for searching spectral characteristic data of sunshine in the sun and the shade corresponding to the position information and the current time from the detailed sunshine spectral characteristic database; and a center-side data transmission unit for transmitting the spectral characteristic data obtained by the sunshine spectral characteristic obtaining unit to the vehicle-mounted apparatus, wherein the obstacle determining unit determines whether the obstacle candidate point corresponds to an obstacle, based on the spectral characteristic data received by the vehicle-side data reception unit.

19. An obstacle detection system comprising:
a vehicle-mounted apparatus comprising the obstacle detection device according to claim 3 mounted thereon; and
an information center internal apparatus for transmitting and receiving data to/from the vehicle-mounted apparatus,
the vehicle-mounted apparatus including:
    a vehicle-side data transmission unit for transmitting current position information to the information center internal apparatus; and
    a vehicle-side data reception unit for receiving spectral characteristic data from the information center internal apparatus,
the information center internal apparatus including:
    a detailed sunshine spectral characteristic database for storing relationship between spectral characteristics of sunshine in a sun and a shade in association with position information and a time;
    a center-side data reception unit for receiving the current position information from the vehicle-side data transmission unit of the vehicle-mounted apparatus;
    a sunshine spectral characteristic obtaining unit for searching spectral characteristic data of sunshine in the sun and the shade corresponding to the position information and the current time from the detailed sunshine spectral characteristic database; and
    a center-side data transmission unit for transmitting the spectral characteristic data obtained by the sunshine spectral characteristic obtaining unit to the vehicle-mounted apparatus,
wherein the obstacle determining unit determines whether the obstacle candidate point corresponds to an obstacle, based on the spectral characteristic data received by the vehicle-side data reception unit.

20. An obstacle detection system comprising:
a vehicle-mounted apparatus having the obstacle detection device according to claim 4 mounted thereon; and
an information center internal apparatus for transmitting and receiving data to/from the vehicle-mounted apparatus,
the vehicle-mounted apparatus including:
    a vehicle-side data transmission unit for transmitting current position information to the information center internal apparatus; and
    a vehicle-side data reception unit for receiving spectral characteristic data from the information center internal apparatus,
the information center internal apparatus including:
    a detailed sunshine spectral characteristic database for storing relationship between spectral characteristics of sunshine in the sun and the shade in association with position information and a time;
    a center-side data reception unit for receiving the current position information from the vehicle-side data transmission unit of the vehicle-mounted apparatus;
    a sunshine spectral characteristic obtaining unit for searching spectral characteristic data of sunshine in the sun and the shade corresponding to the position information and the current time from the detailed sunshine spectral characteristic database; and
    a center-side data transmission unit for transmitting the spectral characteristic data obtained by the sunshine spectral characteristic obtaining unit to the vehicle-mounted apparatus,
wherein the obstacle determining unit determines whether the obstacle candidate point corresponds to an obstacle, based on the spectral characteristic data received by the vehicle-side data reception unit.

* * * * *